United States Patent
Ahluwalia et al.

(10) Patent No.: US 11,096,179 B2
(45) Date of Patent: *Aug. 17, 2021

(54) COMMUNICATION SYSTEM FOR ALLEVIATING INTERFERENCE ARISING DUE TO COEXISTENCE

(71) Applicant: NEC Corporation, Tokyo (JP)

(72) Inventors: Jagdeep Singh Ahluwalia, Sutton (GB); Kenji Kawaguchi, Tokyo (JP); Neeraj Gupta, Sutton (GB)

(73) Assignee: NEC CORPORATION, Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 16/454,173

(22) Filed: Jun. 27, 2019

(65) Prior Publication Data

US 2019/0320441 A1    Oct. 17, 2019

Related U.S. Application Data

(63) Continuation of application No. 15/316,927, filed as application No. PCT/JP2015/067377 on Jun. 10, 2015, now Pat. No. 10,362,581.

(30) Foreign Application Priority Data

Jun. 12, 2014 (GB) .................................. 1410538

(51) Int. Cl.
*H04L 12/28*   (2006.01)
*H04W 72/04*   (2009.01)
(Continued)

(52) U.S. Cl.
CPC ....... *H04W 72/0486* (2013.01); *H04W 16/14* (2013.01); *H04W 72/1215* (2013.01);
(Continued)

(58) Field of Classification Search
CPC ..... H04W 16/14; H04W 28/08; H04W 36/22; H04W 72/0486
(Continued)

(56) References Cited

U.S. PATENT DOCUMENTS 8,958,331 B2    2/2015  Han et al.
8,989,070 B2    3/2015  Jain et al.
(Continued)

FOREIGN PATENT DOCUMENTS

CN    101202974 A    6/2008
CN    101674597 A    3/2010
(Continued)

OTHER PUBLICATIONS

Chinese Office Action for CN Application No. 201580031518.4 dated Sep. 29, 2019 with English Translation.
(Continued)

*Primary Examiner* — John Pezzlo
(74) *Attorney, Agent, or Firm* — Sughrue Mion, PLLC

(57) ABSTRACT

A communication apparatus is disclosed, which comprises a base station module and an access point module for providing wireless connectivity to a communication network to at least one mobile communication device; an interface for coupling the base station module and the access point module for performing at least one of: a channel restriction operation; a power restriction operation; an intelligent uplink scheduling operation; a carrier frequency reselection operation; and a traffic steering operation; whereby alleviating an interference arising due to coexistence of the base station module and the access point module.

6 Claims, 12 Drawing Sheets

(51) Int. Cl.

| | | |
|---|---|---|
| *H04W 16/14* | (2009.01) | |
| *H04W 72/12* | (2009.01) | |
| *H04W 88/10* | (2009.01) | |
| *H04W 76/15* | (2018.01) | |
| H04J 1/16 | (2006.01) | |
| H04W 84/04 | (2009.01) | |
| H04W 92/20 | (2009.01) | |
| H04W 84/12 | (2009.01) | |

(52) U.S. Cl.
CPC .......... *H04W 76/15* (2018.02); *H04W 88/10* (2013.01); *H04W 84/042* (2013.01); *H04W 84/045* (2013.01); *H04W 84/12* (2013.01); *H04W 92/20* (2013.01); *Y02D 30/70* (2020.08)

(58) Field of Classification Search
USPC .............................. 370/252, 278, 329, 430
See application file for complete search history.

(56) References Cited

U.S. PATENT DOCUMENTS

| | | | |
|---|---|---|---|
| 9,106,420 | B2 | 8/2015 | Han et al. |
| 9,154,267 | B2 | 10/2015 | He et al. |
| 9,160,497 | B2 | 10/2015 | Elliott |
| 9,203,563 | B2 | 12/2015 | Etemad et al. |
| 9,225,478 | B2 | 12/2015 | Chen et al. |
| 9,397,795 | B2 | 7/2016 | Choi |
| 9,432,150 | B2 | 8/2016 | Jain et al. |
| 9,544,099 | B2 | 1/2017 | Etemad |
| 9,590,772 | B2 | 3/2017 | Choi et al. |
| 9,673,939 | B2 | 6/2017 | Han et al. |
| 9,706,423 | B2 | 7/2017 | Horn et al. |
| 9,900,820 | B2 | 2/2018 | Gao ...................... H04W 36/28 |
| 10,027,446 | B2 | 7/2018 | Han et al. |
| 2009/0253426 | A1 | 10/2009 | Qiu et al. |
| 2009/0310568 | A1 | 12/2009 | Chen et al. |
| 2010/0235827 | A1* | 9/2010 | Rinne-Rahkola ......... G06F 8/60 717/174 |
| 2010/0296498 | A1 | 11/2010 | Karaoguz et al. |
| 2011/0312288 | A1 | 12/2011 | Fu et al. |
| 2013/0065533 | A1 | 3/2013 | Cai et al. |
| 2013/0114548 | A1 | 5/2013 | Banerjea |
| 2013/0322238 | A1 | 12/2013 | Sirotkin ............ H04W 28/0247 370/230 |
| 2013/0329714 | A1 | 12/2013 | Fan et al. |
| 2014/0141732 | A1 | 5/2014 | Medapalli et al. |
| 2014/0187277 | A1 | 7/2014 | Shi |
| 2015/0109997 | A1 | 4/2015 | Sirotkin .............. H04L 65/1089 370/328 |
| 2015/0249950 | A1* | 9/2015 | Teyeb ................... H04W 28/08 455/437 |
| 2017/0070923 | A1* | 3/2017 | Li ..................... H04W 36/0066 |
| 2017/0223595 | A1* | 8/2017 | Fukuta ................. H04W 36/14 |

FOREIGN PATENT DOCUMENTS

| | | |
|---|---|---|
| CN | 101841880 A | 9/2010 |
| CN | 101895929 A | 11/2010 |
| CN | 102369705 A | 3/2012 |
| CN | 102378192 A | 3/2012 |
| CN | 102573010 A | 7/2012 |
| CN | 103634921 A | 3/2014 |
| CN | 103687014 A | 3/2014 |
| GB | 2498800 A | 7/2013 |
| JP | 2009-303223 A | 12/2009 |
| JP | 2015517241 A | 6/2015 |
| JP | 2015523807 A | 8/2015 |
| JP | 2015534355 A | 11/2015 |
| WO | 2009/009658 A1 | 1/2009 |
| WO | 2013/074458 A1 | 5/2013 |
| WO | 2013/084721 A1 | 6/2013 |
| WO | 2013138708 A1 | 9/2013 |
| WO | 2014008039 A1 | 1/2014 |
| WO | 2014043500 A1 | 3/2014 |

OTHER PUBLICATIONS

EPO Office Action for EP Application No. 15733550.6 dated on Nov. 27, 2019.
3GPP TSG-RAN WG3,#83bis, China Telecom: "Consideration on the interface between the 3GPP RAN node and the WLAN AP" 3GPP Draft; R3-140693, vol. RAN WG3, No. San Jose Del Cabo, Mexico, Mar. 31-Apr. 4, 2014, XP050820680.
3GPP TSG-RAN WG2 Meeting #82, CMCC: "Discussion on Network Selection Solutions" 3GPP Draft; R2-131852, vol. RAN WG2, No. Fukuoka, Japan, May 20-May 24, 2013, XP050699891.
3rd Generation Partnership Project; Technical Specification Group Radio Access Network; Evolved Universal Terrestrial Radio Access (E-UTRA); Radio Resource Control (RRC), Protocol specification (Release 12), 3GPP TS 36.331 V12.1.0 (Mar. 2014).
3rd Generation Partnership Project; Technical Specification Group Radio Access Network; Evolved Universal Terrestrial Radio Access (E-UTRA); User Equipment (UE) radio transmission and reception (Release 12), 3GPP TS 36.101 V12.3.0 (Mar. 2014).
3rd Generation Partnership Project; Technical Specification Group Radio Access Network; Evolved Universal Terrestrial Radio Access (E-UTRA); Physical layer procedures (Release 12), 3GPP TS 36.213 V12.1.0 (Mar. 2014).
Zhenping Hu et al., "Interference avoidance for in-device coexistence in 3GPP LTE-advanced: challenges and solutions", IEEE Communications Magazine, IEEE Service Center, Piscataway, US, vol. 50, No. 11, Nov. 2012, pp. 60-67, XP011472336.
"Integrated Femto-WiFi (IFW) Networks", Small Cell Forum Ltd, United Kingdom, Feb. 28, 2012.
International Search Report for PCT Application No. PCT/JP2015/067377, dated Oct. 13, 2015.
Written Opinion of the International Search Authority for PCT Application No. PCT/JP2015/067377.
Japanese Office Action for JP Application No. 2018-570083 dated Jan. 10, 2018 with English Translation.
Communication dated Aug. 15, 2018, issued by the Japan Patent Office in corresponding Japanese Application No. 2016-570063.
3 GPP workshop on LTE in unlicensed spectrum, Views on LAA for Unlicensed Spectrum—Scenarios and Initial Evaluation Results—NTT DOCOMO, Inc., Jun. 13, 2014, RWS-140026, 12 pages total.
Verizon, CMCC, Huawei, Ericsson, 3GPP TSG RAN Workshop on LTE in Unlicensed Spectrum, Use Cases & Scenarios for Licensed Assisted Access, Jun. 13, 2013, RWS-140020, 11 pages total.
Chinese Office Action for CN Application No. 201580031518.4 dated Mar. 5, 2019 with English Translation.
Kyocera Corp., "Multi-RAT Joint coordination involving WLAN", 3GPP TSG RAN WG3 Meeting #83-bis, Mar. 31-Apr. 4, 2014, R3-140758, pp. 1-6.
CMCC, "Network Selection for WLAN/3GPP Radio Interworking", 3GPP TSG-RAN WG2 Meeting #81bis, Apr. 15-19, 2013, R2-130973, total 5 pages.
Communication dated May 17, 2019 from European Patent Office in counterpart EP Application No. 15 733 550.6.

\* cited by examiner

COMMUNICATION SYSTEM FOR ALLEVIATING INTERFERENCE ARISING DUE TO COEXISTENCE

The present application is a Continuation application of Ser. No. 15/316,927 filed on Dec. 7, 2016, which is a National Stage Entry of PCT/JP2015/067377 filed on Jun. 10, 2015, which claims priority from United Kingdom Patent Application 1410538.1 filed on Jun. 12, 2014, the contents of all of which are incorporated herein by reference, in their entirety.

TECHNICAL FIELD

The present invention relates to radio access networks in a cellular or wireless telecommunication network, and particularly but not exclusively to networks operating according to the 3GPP standards or equivalents or derivatives thereof. The invention has particular although not exclusive relevance to the Long Term Evolution (LTE) of UTRAN (called Evolved Universal Terrestrial Radio Access Network (E-UTRAN)) and to operation of dual mode base stations operating in accordance with both LTE and non-LTE radio technologies.

BACKGROUND ART

In a cellular communication network, mobile devices (also known as User Equipment (UE) or mobile terminals, such as mobile telephones) communicate with remote servers or with other mobile devices via base stations. An LTE base station is also known as an 'enhanced NodeB' (eNB), which is coupled to an LTE core network also known as an Enhanced Packet Core (EPC) network.

In their communication with each other, LTE mobile devices and base stations use licensed radio frequencies, which are typically divided into frequency bands and/or time blocks. Depending on various criteria (such as the amount of data to be transmitted, radio technologies supported by the mobile device, expected quality of service, subscription settings, etc.), each base station is responsible for controlling the transmission timings, frequencies, transmission powers, modulations, etc. employed by the mobile devices attached to the base station. In order to minimise disruption to the service and to maximise utilisation of the available bandwidth, the base stations continuously adjust their own transmission power and also that of the mobile devices. Base stations also assign frequency bands and/or time slots to mobile devices, and also select and enforce the appropriate transmission technology to be used between the base stations and the attached mobile devices. By doing so, base stations also reduce or eliminate any harmful interference caused by mobile devices to each other or to the base stations.

Current mobile devices typically support multiple radio technologies, not only LTE. The mobile devices might include, for example, transceivers and/or receivers operating in the Industrial, Scientific and Medical (ISM) radio bands, such as Bluetooth or Wi-Fi transceivers. The term 'Bluetooth' refers to the standards developed by the Bluetooth Special Interest Group, and the term 'Wi-Fi' refers to the 802.11 family of standards developed by the Institute of Electrical and Electronics Engineers (IEEE). If such a non-LTE communication technology is supported, instead of communicating via LTE base stations, mobile devices may also communicate with remote servers or with other mobile devices using non-LTE communication means, e.g. using an appropriate ISM communication technology. For example, the mobile devices may communicate via an access point (e.g. a Wi-Fi AP) operating in accordance with the 802.11 family of standards by the Institute of Electrical and Electronics Engineers (IEEE).

Recently, a so-called 'dual mode' base station has been introduced comprising an LTE home base station (HeNB) part (e.g. a pico/femto base station or other low-power node) and a non-LTE access point part (e.g. a Wi-Fi AP). Such a combined HeNB/AP base station may also sometimes be referred to as a dual mode femto access point (FAP) or dual FAP.

ISM and other radio technologies (hereafter commonly referred to as non-LTE technologies) use frequency bands close to or partially overlapping with the LTE frequency bands, as illustrated in FIG. 12. Some of these non-LTE frequency bands are licensed for a particular use (e.g. Global Positioning Systems (GPS) bands) or might be unlicensed bands and can be used by a number of radio technologies (such as Bluetooth and Wi-Fi standards using the same range of ISM frequency bands). The manner in which these non-LTE frequency bands are used are, therefore, not covered by the LTE standards and are not controlled by the LTE base stations (e.g. a HeNB of a dual FAP). However, transmissions in the non-LTE frequency bands might, nevertheless, still cause undesired interference to (or suffer undesired interference resulting from) transmissions in the LTE bands, particularly in the overlapping or neighbouring frequency bands.

In particular, such undesired interference may be experienced between LTE and non-LTE (ISM) radio communications in at least the following scenarios:

LTE Band 40/41 radio transmitter causing interference to ISM radio receiver;

ISM radio transmitter causing interference to LTE Band 40/41 radio receiver;

LTE Band 7 radio transmitter causing interference to ISM radio receiver;

ISM radio transmitter causing interference to LTE Band 7 radio receiver; and

LTE Band 7/13/14 radio transmitter causing interference to GPS radio receiver.

When such undesired interference arises as a result of communication occurring concurrently in the same mobile device or in the same base station (for example, as a result of concurrent use of LTE and non-LTE radio technologies) the interference is sometimes referred to as 'in-device coexistence (IDC) interference' which causes an 'in-device coexistence (IDC) situation'.

In order to be able to alleviate the problems due to IDC interference, the mobile device may be configured to attempt to address such IDC problems on its own and, if the mobile device cannot solve the problem on its own, with the assistance of its serving base station. For example, an IDC problem may be addressed by the base station selecting a different frequency (FDM solution) for the mobile device, by reconfiguring its transmissions (e.g. apply discontinuous reception (DRX) and/or change its subframe pattern) (TDM solution), and/or by adjusting the base station's (and/or the mobile device's) transmission power (Power Control solution).

The inventors have realised that difficulties may arise in simultaneously operating both the LTE and non-LTE parts of such dual FAPs due to the potentially severe interference experienced in some of the (neighbouring or overlapping) frequency bands used by both the LTE and the non-LTE communication technologies.

Such difficulties are particularly likely to occur with respect to dual FAPs implementing both an LTE base station and a non-LTE access point as part of the same network node. In this case, the above (FDM/TDM/Power Control) solutions are not always applicable because any change in the operation of the LTE base station (of the dual FAP) may still cause (or continue to cause) unexpected interference for communications using the access point part of the dual FAP.

The inventors have also realised that whilst it is possible to co-ordinate some of the operations of LTE base stations and other base stations operating in accordance with an earlier standard from which LTE has been derived, e.g. due to the inherent backward compatibility between such related standards, it is particularly difficult to ensure optimal communication characteristics (e.g. signal quality, error rate, interference level) for dual FAPs implementing both an LTE base station and a non-LTE access point because of the differences between the operation of the LTE and the non-LTE parts.

SUMMARY OF INVENTION

There is therefore a need to improve the operation of the mobile device and the dual FAP in order to overcome or at least alleviate the above problems. Exemplary embodiments of the present invention aim to provide improved techniques for alleviating interference (hence improving data throughput) in a communication network and, in particular, for alleviating radio interference caused to, or by, transmissions via a dual FAP (and/or the like).

In one aspect, the invention provides a communication apparatus comprising: a base station module for providing wireless connectivity in a communication network, using a first communication protocol, to at least one mobile communication device; an access point module for providing wireless connectivity in a communication network, using a second communication protocol, to the at least one mobile communication device; and an interface for coupling the base station module and the access point module, wherein said interface is configured for communication between said base station module and said access point module; wherein said base station module and said access point module are configured for co-operation with one another by communicating via said interface, and wherein at least one of said base station module and said access point module is configured to perform at least one operation to alleviate interference arising due to coexistence, in said communication apparatus, of said base station module and said access point module, as part of said co-operation.

In one aspect, the invention provides a method performed by a communication apparatus comprising: i) a base station module for providing wireless connectivity, using a first communication protocol, in a communication network to at least one mobile communication device; ii) an access point module for providing wireless connectivity, using a second communication protocol, in a communication network to the at least one mobile communication device; and iii) an interface for coupling the base station module and the access point module, wherein said interface is configured for communication between said base station module and said access point module; the method comprising: the base station module and the access point module co-operating with one another by communicating via said interface, and at least one of said base station module and said access point module performing at least one operation to alleviate interference arising due to the coexistence, in said communication apparatus, of said base station module and said access point module, as part of said co-operating.

In one aspect, the invention provides a system for use in a telecommunication network, comprising one or more mobile communication devices and the above described communication apparatus.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

BRIEF DESCRIPTION OF DRAWINGS

Exemplary embodiments of the invention will now be described, by way of example, with reference to the accompanying drawings in which.

DESCRIPTION OF EMBODIMENTS

Overview

Figure 1:
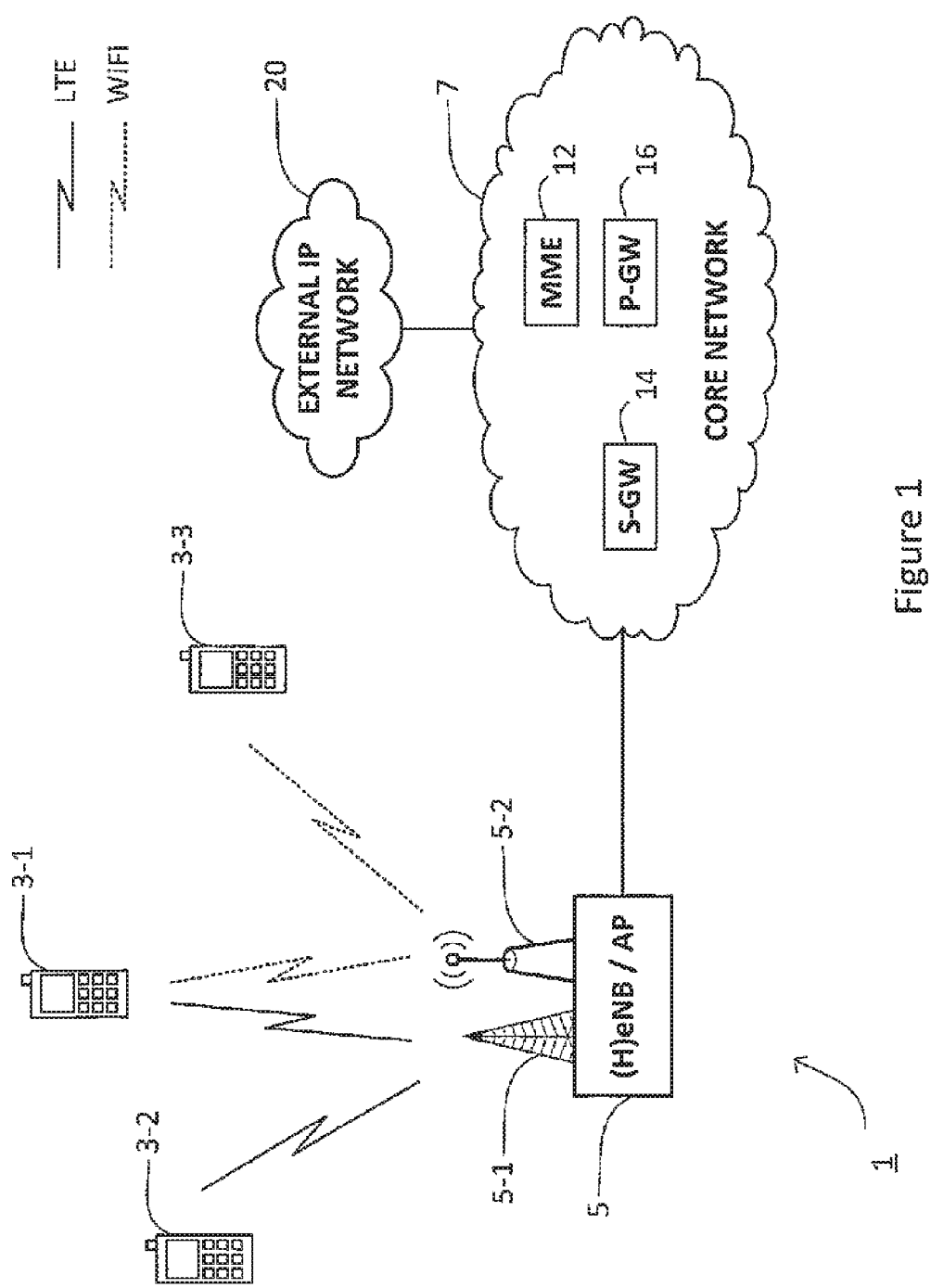
FIG. 1 schematically illustrates a mobile telecommunication system of a type to which the invention is applicable.
Figure 2:
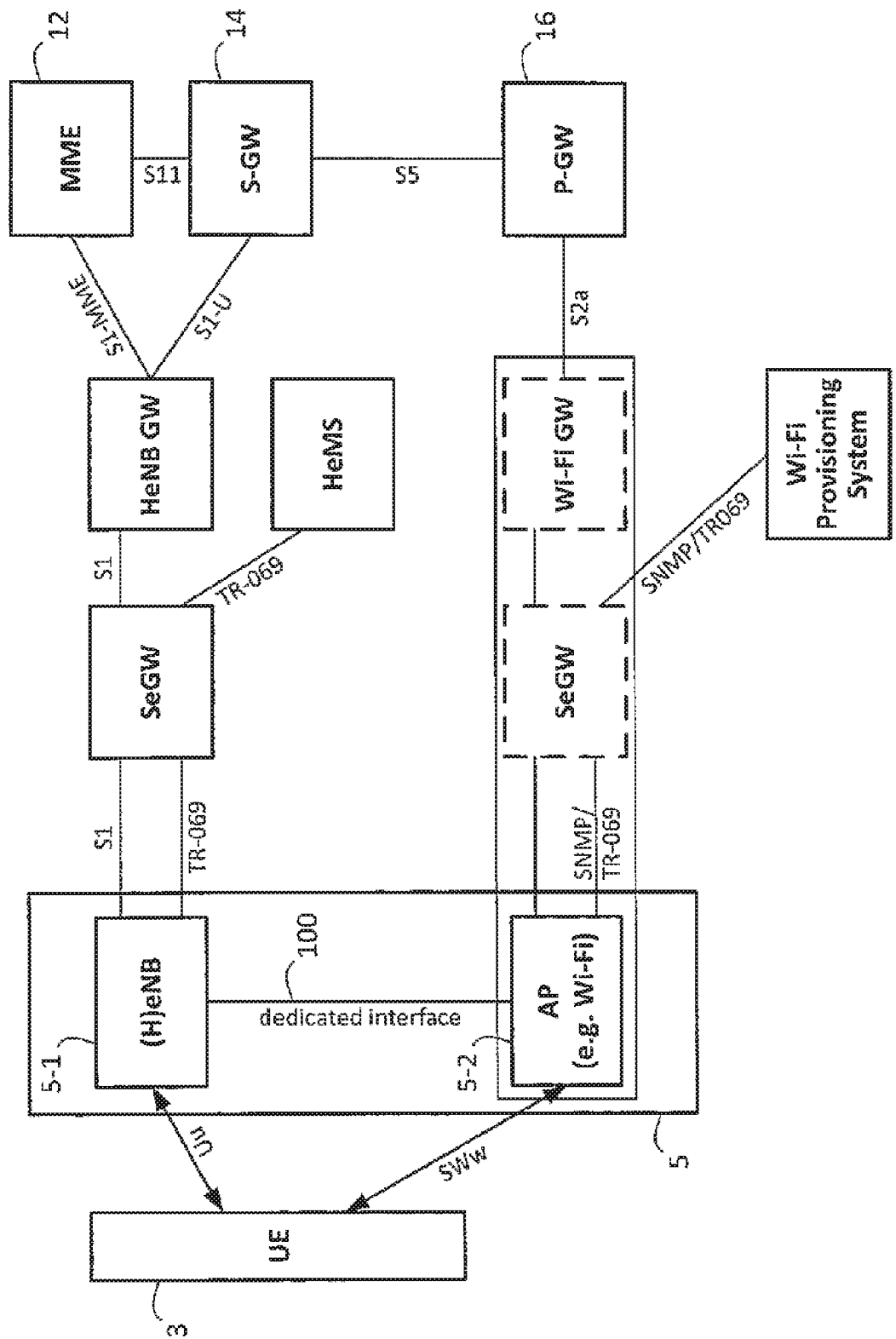
FIG. 2 schematically illustrates the relationship between some of the entities forming part of the mobile telecommunication system of FIG. 1.

FIG. 1 schematically illustrates a mobile (cellular) telecommunication system 1 in which users of mobile devices 3 (for example mobile telephones 3-1 to 3-3) can communicate with other users via one or more base stations 5 and a core network 7. In the system illustrated in FIG. 1, the base station 5 is a dual mode base station (dual FAP) which comprises an LTE home base station (HeNB) part 5-1 (e.g. a pico/femto base station or other low-power node) and a non-LTE access point (AP) part 5-2 (e.g. a Wi-Fi AP). In this example, the HeNB part 5-1 and the AP part 5-2 are co-located (and hence they share at least some hardware and/or software components), although the HeNB part 5-1 and the AP part 5-2 may also be implemented as two physically separate units. An appropriate dedicated interface (e.g. an internal interface or an external one) is provided for communications between the HeNB part 5-1 and the AP part 5-2. Further details about the relationship (and communication links provided) between the HeNB part 5-1 and the AP part 5-2 and various associated network nodes are illustrated in FIG. 2.

Both the HeNB part 5-1 and the AP part 5-2 operate at least one cell (not shown), each cell having a number of uplink (UL) and downlink (DL) communication resources (channels, sub-carriers, time slots, etc.) that are available for wireless communications between the mobile devices 3 and the dual FAP 5 (i.e. the HeNB part 5-1 and/or the AP part 5-2). In this example, the Radio Access Technologies (RATs) employed by the dual FAP 5 operate according to either Frequency Division Duplexing (FDD) or Time Division Duplexing (TDD). In TDD, the time domain of a communication channel is divided into several recurrent time slots of fixed length in which communication to/from the dual FAP 5 can be scheduled. In operation in TDD, two or more data streams may be transferred between the dual FAP 5 (e.g. HeNB part 5-1) and the mobile device(s) 3, apparently simultaneously, in sub-channels of one communication channel, by scheduling each data stream in different time slots of the channel (effectively 'taking turns'). In FDD, the bandwidth available to the base station is divided into a series of non-overlapping frequency sub-bands each comprising frequency resources that may be assigned to mobile device(s) 3 for communication via the dual FAP 5.

In this example, the first mobile device 3-1 is connected to both the HeNB part 5-1 and the AP part 5-2, whilst the second mobile device 3-2 is connected to the HeNB part 5-1 only, and the third mobile device 3-3 is connected to the AP part 5-2 only. Whilst this particular arrangement is shown in FIG. 1 for purely illustrative purposes, it will be appreciated that compatible mobile devices 3 may connect to either one or both of the HeNB part 5-1 and the AP part 5-2 (and/or to any further base station) depending on their capabilities, applicable configurations, and/or network conditions that are outside the scope of the present invention.

As can be seen, at least the mobile devices 3-1 and 3-3 are capable of communicating using non-LTE radio technologies such as those which use resources of the Industrial, Scientific and Medical (ISM) frequency bands. In this example, the mobile devices 3-1 and 3-3 can communicate with the AP part 5-2 of the dial FAP 5 operating according to one of the 802.11 family of standards (Wi-Fi) defined by the Institute of Electrical and Electronics Engineers (IEEE). Although not shown in FIG. 1, each of the mobile devices 3 may also be able to communicate with other non-LTE transceivers, e.g. with a wireless headset operating according to the Bluetooth standard defined by the Bluetooth Special Interest Group (SIG) and/or support positioning technologies and thus communicate with, for example, a positioning satellite using GPS signals.

Communications between the mobile device(s) 3 and the AP part 5-2 (and possibly between the mobile devices 3 and other non-LTE transceivers) might occur substantially concurrently with the communications between the mobile device(s) 3 and the HeNB part 5-1, which concurrent communications have the potential to cause undesirable interference (i.e. IDC interference).

Figure 3:
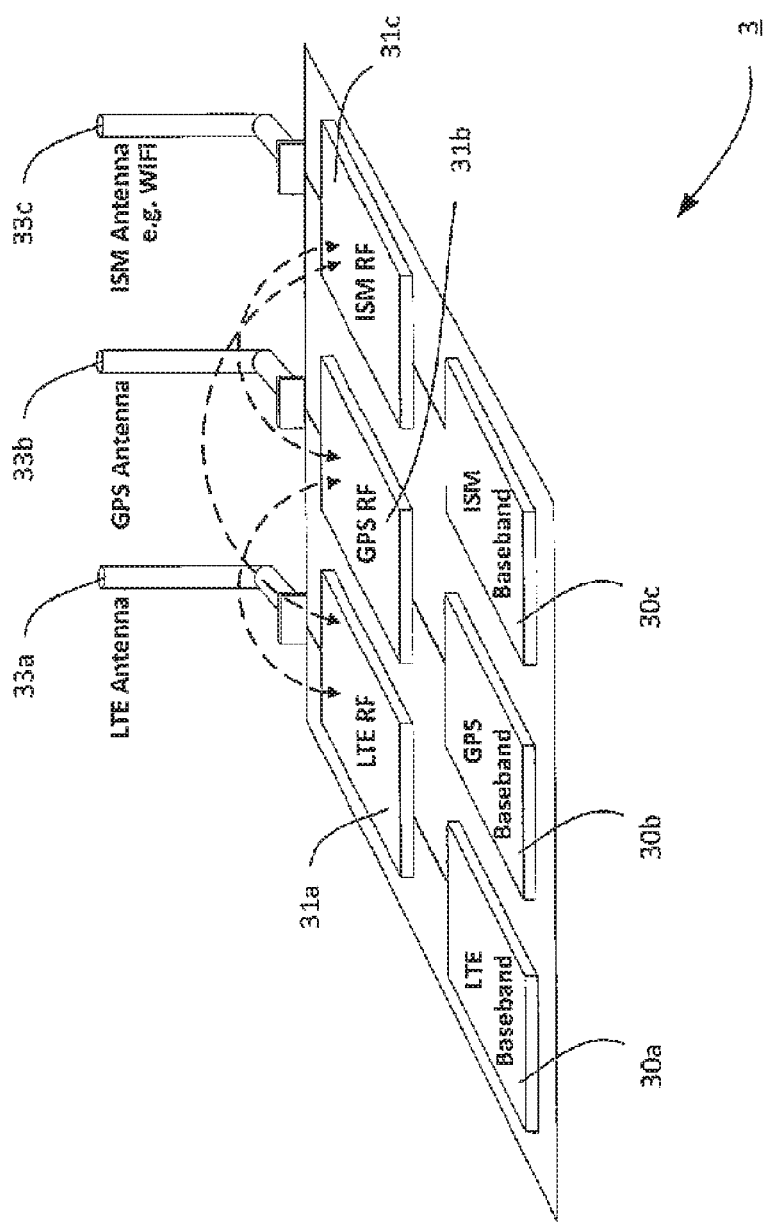
FIG. 3 schematically illustrates various radio transceiver circuits implemented on a mobile device of the mobile telecommunication system shown in FIG. 1.
Figure 4:
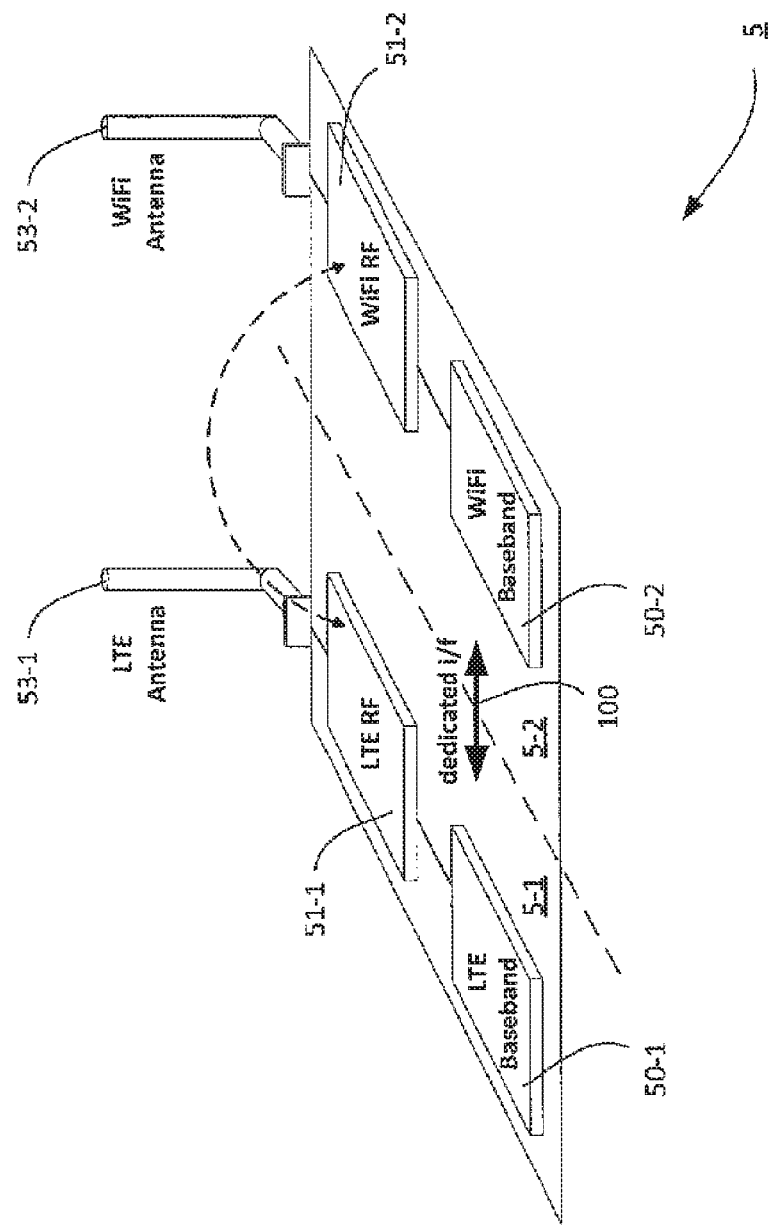
FIG. 4 schematically illustrates various radio transceiver circuits implemented on the base station of the mobile telecommunication system shown in FIG. 1.

The issue of IDC interference is illustrated further in FIG. 3 which schematically illustrates, purely illustratively, the various radio transceiver circuits implemented on a mobile device 3 shown in FIG. 1. Further, FIG. 4 schematically illustrates, purely illustratively, the various radio transceiver circuits implemented on the dual FAP 5 shown in FIG. 1. As shown in FIG. 3, the mobile device (e.g. mobile device 3-1) comprises an LTE baseband circuit 30a, a GPS baseband circuit 30b, and an ISM baseband circuit 30c. Each baseband circuit 30a to 30c is coupled to a radio frequency (RF) transceiver (or receiver), i.e. LTE RF transceiver 31a, GPS RF transceiver 31b, and ISM RF transceiver 31c, respectively. Communications in the LTE band are carried out using an LTE antenna 33a. Similarly, communications in the non-LTE bands are carried out using the respective GPS antenna 33b and/or the ISM antenna 33c.

As indicated by dashed arrows in FIG. 3, any of the transceivers 31a to 31c might suffer interference from either one of the other transceivers operating in the same mobile device 3. Similarly, as indicated by dashed arrow in FIG. 4, the transceivers 51-1 and 51-2 of the base station 5 might also suffer interference from each other (and/or from the transceivers 31a to 31c of the mobile device 3).

Returning to FIG. 1, the dual FAP 5 is beneficially configured to alleviate any such in-device coexistence (IDC) interference. Specifically, the HeNB part 5-1 and the AP part 5-2 are configured to co-ordinate their operations, e.g. by exchanging information using the dedicated interface 100 provided therebetween (e.g. an interface provided directly between the HeNB part 5-1 and the AP part 5-2 and/or using an external connection, such as a connection provided via one or more gateways and/or the core network 7).

In particular, the HeNB part 5-1 and the AP part 5-2 are configured to interact with each other for the alleviation of an (ongoing/potential) IDC interference by exchanging information relating to one or more of the following functionalities:

interference management;
power control;
carrier frequency re-selection;
energy saving;
radio transmission state (e.g. on/off); and
load balancing.

For example, by exchanging some of the above information, the dual FAP 5 is beneficially able to alleviate an IDC interference in LTE Band 40 (which may be caused by transmissions, in the lower portion of the ISM band, to LTE Band 40, or vice versa). In this case, one or more of the following solutions may be applied by the dual FAP 5:

i) the HeNB part 5-1 may request the AP part 5-2 not to use one or more channels close to the lower portion of the ISM band (e.g. ISM Channels 1 to 3), i.e. to select other channels if possible;
  ii) the HeNB part 5-1 may restrict (avoid) scheduling the PRBs in the higher portion of LTE Band 40 in both uplink and downlink (i.e. in a region close to ISM Channel 1) when the coexisting Wi-Fi devices, such as the AP part 5-2 and a Wi-Fi capable mobile device 3, use one or more ISM channels close to LTE Band 40; and
  iii) the HeNB part 5-1 may impose power restrictions (for LTE communications) while scheduling the PRBs in the higher portion of LTE Band 40 in both uplink and downlink (i.e. in a region close to ISM Channel 1) if it is found necessary to use these PRBs (e.g. if solution ii) is not or cannot be employed).

Similarly to the above, the dual FAP 5 is also beneficially able to alleviate an IDC interference in LTE Band 7 (which may be caused by transmissions, in ISM Channel 14, to LTE Band 7, or vice versa, since there is only a 5 MHz separation between the uplink portion of LTE Band 7 and Wi-Fi Channel 14, and almost half of Wi-Fi Channel 14 lies within the LTE guard band). In this case, one or more of the following possible solutions may be applied by the dual FAP 5:

iv) the HeNB part 5-1 may request the AP part 5-2 not to use one or more channels close to the higher portion of the ISM band (e.g. ISM Channels 12 to 14), i.e. to select other channels if possible;

v) the HeNB part 5-1 may restrict (avoid) scheduling the PRBs in the lower portion of LTE Band 7 in uplink (i.e. in a region close to ISM Channel 14) when the coexisting Wi-Fi devices (such as the AP part 5-2 and a Wi-Fi capable mobile device 3) are using one or more channels close to LTE Band 7; and vi) the HeNB part 5-1 may obtain timing information from the AP part 5-2, using which information the HeNB part 5-1 may be arranged to avoid scheduling any uplink (LTE) communications (at least in LTE Band 7) at least for the duration of any ISM transmission by the AP part 5-2 (or the mobile devices 3) in Wi-Fi Channel 14.

It will be appreciated that solutions iv) to vi) may also be applied to LTE Band 41 instead of (or in addition to) LTE Band 7.

Furthermore, the HeNB part 5-1 may be configured to adjust its maximum transmission power on the downlink (and/or to adjust the maximum transmission power allowed for the mobile device 3 on the uplink) in accordance with information relating to the operation of the AP part 5-2 (e.g. channels used, transmit powers, etc.), and thereby alleviate any interference caused by the LTE transmissions of the HeNB part 5-1 to the AP part 5-2. Similarly, the AP part 5-2 may be advantageously configured to obtain information from the HeNB part 5-1 relating to the currently used/permitted power (e.g. maximum or average power) by the HeNB part 5-1 for its downlink and uplink communications with the mobile devices 3, and to adjust its own transmissions accordingly.

The HeNB part 5-1 may also be configured to alleviate any interference caused by the LTE transmissions of the HeNB part 5-1 to the AP part 5-2 by initiating carrier frequency re-selection procedures with respect to the mobile devices 3 for which LTE communications are scheduled in LTE Bands prone to causing interference to (or experiencing interference from) the ISM communications. For example, the HeNB part 5-1 may be configured to determine, based on information relating to the operation of the AP part 5-2 (e.g. the ISM channels and/or the associated transmission power being used), which carrier frequency needs to be re-selected (e.g. instead of an interfering or potentially interfering carrier frequency currently used).

Moreover, the HeNB part 5-1 and the AP part 5-2 may also be configured to inform each other when their transceivers are entering and/or exiting a low-power operating mode (e.g. an energy saving mode) during which transmissions over one or more (e.g. all) frequency bands are suspended. Using the exchanged information relating to the current power state of the HeNB part 5-1 and/or the AP part 5-2, the dual FAP 5 is beneficially able to alleviate a potential interference by restricting/allowing the use of certain frequency bands/channels in dependence on the current operating mode of the HeNB part 5-1 and/or the AP part 5-2. For example, the AP part 5-2 may restrict usage of certain ISM channels whilst the HeNB part 5-1 is operating at normal power (i.e. whilst the HeNB part is not in a power saving mode) and allow usage of such ISM channels whilst the HeNB part 5-1 is operating in a power saving mode (and this has been informed by the HeNB part 5-1).

The HeNB part 5-1 and the AP part 5-2 may also be configured to perform load balancing (e.g. by steering traffic between the HeNB part 5-1 and the AP part 5-2) based on the information exchanged between them. In this case, the exchanged information may relate to the number of mobile devices 3 served by the HeNB part 5-1 and the AP part 5-2, respectively and/or the associated load (or remaining capacity) thereof.

In summary, any of the above approaches may beneficially contribute to the alleviation (e.g. reduction, prevention) of interference arising due to the co-location of the HeNB part 5-1 and the AP part 5-2 in the dual FAP 5 (and/or the like). This in turn may increase the overall data throughput that can be achieved by the dual FAP 5 compared to other dual mode base stations that do not support the above features.

Mobile Device

Figure 5:
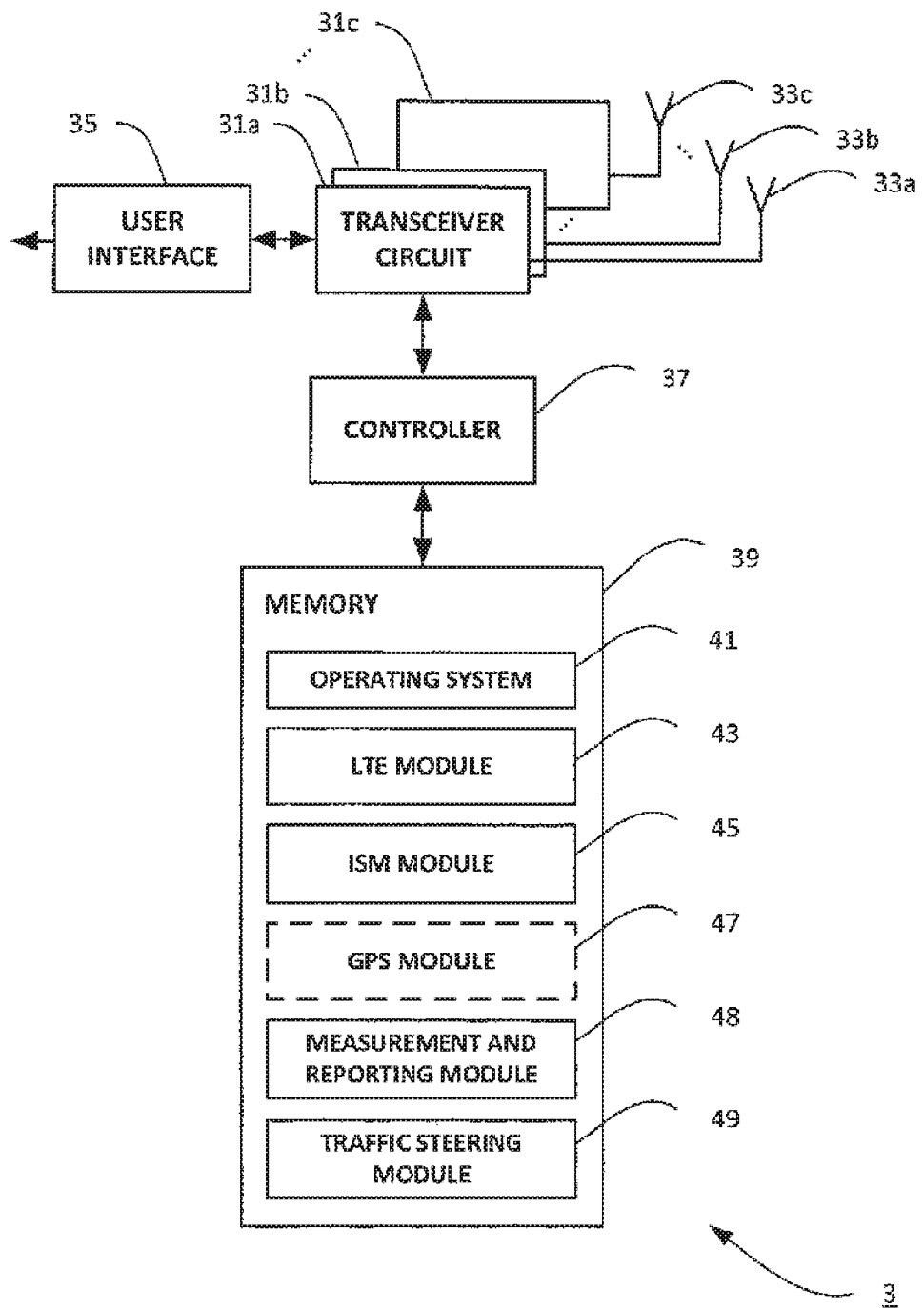
FIG. 5 is a block diagram of a mobile device forming part of the mobile telecommunication system shown in FIG. 1.

FIG. 5 is a block diagram of a mobile device 3 forming part of the mobile telecommunication system 1 shown in FIG. 1. As shown, the mobile device 3 includes transceiver circuits 31a to 31c which are operable to transmit signals to and to receive signals from the base station 5 via one or more antennas 33a to 33c. Although not necessarily shown in FIG. 5, the mobile device 3 may of course have all the usual functionality of a conventional mobile telephone (such as a user interface 35) and this may be provided by any one or any combination of hardware, software and firmware, as appropriate. The mobile device 3 has a controller 37 to control the operation of the mobile device 3. The controller 37 is associated with a memory 39 and is coupled to the transceiver circuits 31a to 31c. The controller 37 controls the operation of the transceiver circuits 31a to 31c in accordance with software and data stored in memory 39.

Software may be pre-installed in the memory 39 and/or may be downloaded via the telecommunications network or from a removable data storage device (RMD), for example. The software includes, among other things, an operating system 41, an LTE module 43, an ISM module 45, a GPS module 47 (optional), a measurement and reporting module 48, and a traffic steering module 49.

The LTE module 43 controls the communications of the mobile device 3 using the LTE radio technologies. The LTE module 43 receives instructions from the base station 5 (via the LTE transceiver circuit 31a and the LTE antenna 33a) and stores them in the memory 39. Based on the received instructions, the LTE module 43 is operable to select the appropriate frequency band, transmission power, modulation mode etc. used in the LTE communications. The LTE module 43 is also operable to update the base station 5 about the amount and type of uplink and/or downlink data scheduled for transmission in order to assist the base station 5 in allocating resources among the mobile devices it is serving.

The ISM module 45 controls the ISM (e.g. IEEE 802.11) communications of the mobile device 3. In doing so, the ISM module 45 might, for example, use data received from the access point part 5-2 and/or communicate with a wireless headset and/or the like.

If present, the GPS module 47 is operable to obtain a current geographic location of the mobile device 3 and to control the GPS communications of the mobile device 3. In doing so, the GPS module 47 might, for example, use data received from a positioning satellite.

The measurement and reporting module 48 is responsible for performing signal measurements (including interference measurements) and to generate and send (via the LTE transceiver 31a) a measurement report to the HeNB part 5-1. In order to do so, the measurement and reporting module 48 is operable to obtain a measurement configuration from the HeNB part 5-1. The measurement and reporting module 48 may also be operable to indicate the occurrence of in-device interference by sending an associated IDC indication to the HeNB part 5-1 via the LTE transceiver 31a. In this embodiment the measurement and reporting module 48 and the HeNB part 5-1 communicates using one or more dedicated radio resource control (RRC) message although any appropriate signalling may be used.

The traffic steering module 49 is responsible for steering traffic between the HeNB part 5-1 and the AP part 5-2, as instructed by the dual FAP 5. In order to do so, the traffic steering module 49 is operable to receive and process a steering command from the HeNB part 5-1. Such steering command may be received, for example, subsequent to (e.g. in response to) the measurement and reporting module 48 sending a measurement report to the HeNB part 5-1.

LTE Base Station

Figure 6:
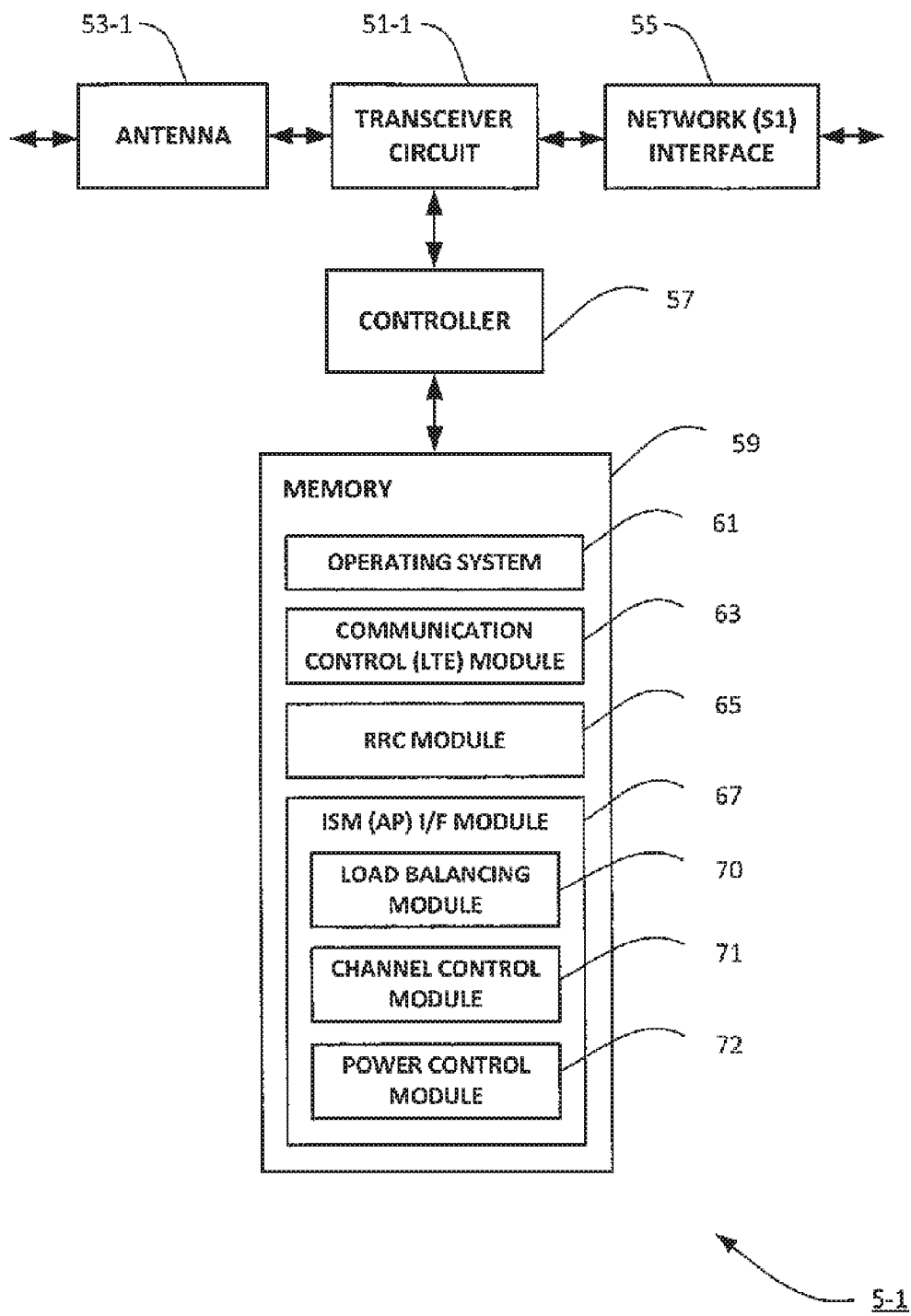
FIG. 6 is a block diagram of the home base station forming part of the mobile telecommunication system shown in FIG. 1.

FIG. 6 is a block diagram of the HeNB part 5-1 of the dual FAP 5 forming part of the mobile telecommunication system 1 shown in FIG. 1. As shown, the HeNB part 5-1 includes a transceiver circuit 51-1 which is operable to transmit signals to and to receive signals from the mobile devices 3 via one or more antennas 53-1 and to transmit signals to and receive signals from the core network 7 and other base stations via the network interface 55 (which may be a copper or optical fibre interface). A controller 57 controls the operation of the transceiver circuit 51-1 in accordance with software and data stored in memory 59. The software includes, among other things, an operating system 61, an LTE communication control module 63, a radio resource control (RRC) module 65, and an ISM interface module 67 (which includes a load balancing module 70, a channel control module 71, and a power control module 72).

The communication control module 63 controls communications between the HeNB part 5-1 (i.e. the LTE base station part of the dual FAP 5) and external devices (such as the mobile devices 3) via the transceiver circuit 51-1 and the one or more antenna 53-1. The communication control module 63 also controls communications between the HeNB part 5-1 and core network nodes (such as the MME 12, the S-GW 14, and/or the P-GW 16) via the transceiver circuit 51-1 and the network interface 55 (which may comprise e.g. an S1 interface).

The RRC module 65 manages (generates, sends, and receives) messages formatted in accordance with the RRC protocol. For example, the RRC module 65 is operable to communicate RRC messages with the mobile devices 3 (e.g. RRC messages relating to signal measurements).

The ISM interface module 67 controls communication with the AP part 5-2 (with the corresponding LTE interface module 69 thereof) over the dedicated interface 100 provided between the HeNB part 5-1 and the AP part 5-2. For example, the ISM interface module 67 is operable to exchange information with the AP part 5-2 in order to assist the alleviation of interference resulting from the simultaneous use of both the LTE and the non-LTE (ISM) communication technologies. Specifically, the ISM interface module 67 includes the load balancing module 70, which is responsible for performing load balancing based in information exchanged with the AP part 5-2. The ISM interface module 67 also includes the channel control module 71, which is responsible for performing channel control based in information exchanged with the AP part 5-2. In this example, the ISM interface module 67 further includes the power control module 72, which is responsible for performing power control (based in information exchanged with the AP part 5-2). It will be appreciated that the ISM interface module 67 may include a number of additional modules and/or that any of the modules 70 to 72 (and/or any such additional modules) may be combined, if appropriate.

Access Point

Figure 7:
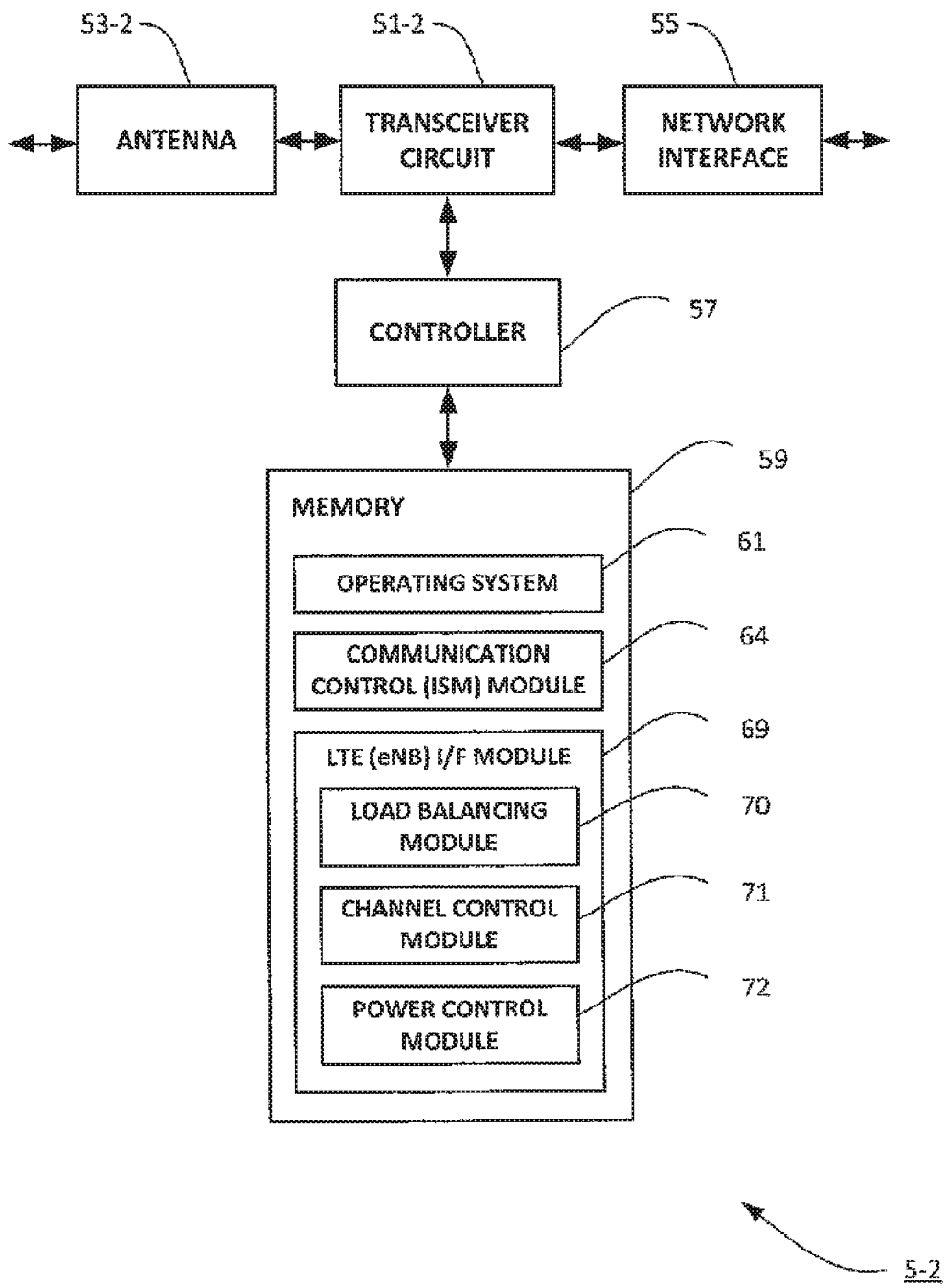
FIG. 7 is a block diagram of the access point forming part of the mobile telecommunication system shown in FIG. 1.

FIG. 7 is a block diagram of the access point part 5-2 of the dual FAP 5 forming part of the mobile telecommunication system 1 shown in FIG. 1. As shown, the access point part 5-2 includes a transceiver circuit 51-2 which is operable to transmit signals to and to receive signals from the mobile devices 3 via one or more antennas 53-2 and to transmit signals to and receive signals from the core network 7 and other base stations 5 via the network interface 55 (which may be a copper or optical fibre interface). A controller 57 controls the operation of the transceiver circuit 51-2 in accordance with software and data stored in memory 59. The software includes, among other things, an operating system 61, a non-LTE (e.g. ISM) communication control module 64, and an LTE interface module 69 (which includes a load balancing module 70, a channel control module 71, and a power control module 72)

The communication control module 64 controls communications between the access point part 5-2 and external devices (such as the mobile devices 3) via the transceiver circuit 51-2 and the one or more antenna 53-2. The communication control module 64 also controls communications between the AP part 5-2 and other network nodes (either directly or via one or more gateways) via the transceiver circuit 51-2 and the network interface 55.

The LTE interface module 69 controls communication with the HeNB part 5-1 (with the corresponding ISM interface module 67 thereof) over the dedicated interface 100 provided between the HeNB part 5-1 and the AP part 5-2. For example, the LTE interface module 69 is operable to exchange information with the HeNB part 5-1 in order to assist the alleviation of interference resulting from the simultaneous use of both the LTE and the non-LTE (ISM) communication technologies. Specifically, the LTE interface module 69 includes the load balancing module 70, which is responsible for performing load balancing based in information exchanged with the HeNB part 5-1. The LTE interface module 69 also includes the channel control module 71, which is responsible for performing channel control based in information exchanged with the HeNB part 5-1. In this example, the LTE interface module 69 further includes the power control module 72, which is responsible for performing power control (based in information exchanged with the HeNB part 5-1). It will be appreciated that the LTE interface module 69 may include a number of additional modules and/or that any of the modules 70 to 72 (and/or any such additional modules) may be combined, if appropriate.

In the above description, the mobile device 3, the home base station 5-1, and the access point part 5-2 are described for ease of understanding as having a number of discrete modules (such as the communication control modules and the LTE/ISM interface modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Operation

Examples of methods used for alleviating interference, between the home base station 5-1 and the access point part 5-2 of a dual FAP 5, will now be described. Although for efficiency of understanding for those skilled in the art, the invention will be described in detail in the context of a home base station (HeNB part) and an access point part of a dual FAP, the principles described herein can be applied to a 'multimode' FAP comprising more than one (home) base station and/or more than one access point part (which may each operate according to different standards) with the corresponding elements of the system changed as required.

First Embodiment

Figure 8A:
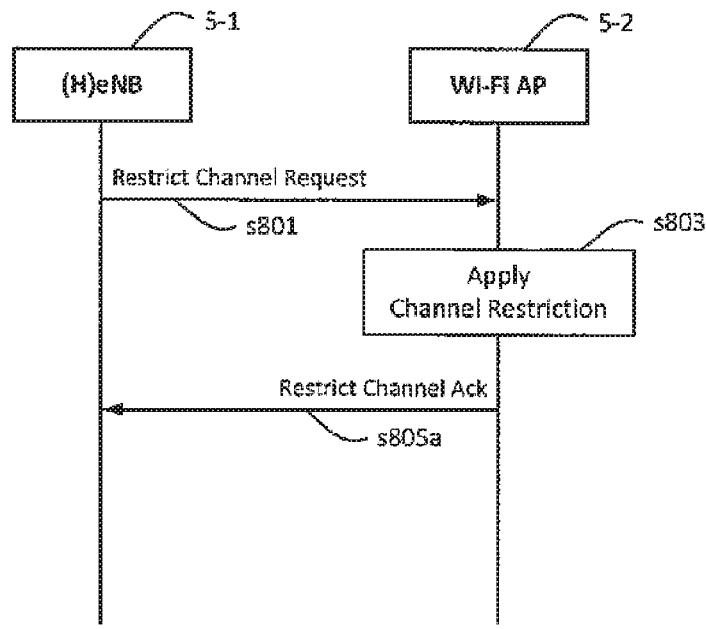
FIGS. 8a to 11 are exemplary timing diagrams illustrating various methods performed by the nodes forming part of the mobile telecommunication system shown in FIG. 1.

FIG. 8a shows an exemplary timing diagram illustrating a method performed by the HeNB part 5-1 and the AP part 5-2 of the mobile telecommunication system 1 shown in FIG. 1. In this example, the HeNB part 5-1 and the AP part 5-2 are configured to apply channel restriction, e.g. in order to alleviate (on-going or potential) interference resulting from the simultaneous use of both the LTE and the non-LTE (ISM) communication technologies.

As mentioned above, the HeNB part 5-1 and the AP part 5-2 are configured to alleviate any IDC interference (ongoing and/or potential) by exchanging information (either within the dual FAP 5 or using an external connection, such as a connection provided via one or more gateways and/or the core network 7).

In this example, the HeNB part 5-1 requests the AP part 5-2 not to use one or more channels close to the lower portion of the ISM band (e.g. ISM Channels 1 to 3). In order to do so, the HeNB part 5-1 generates (using its ISM interface module 67/channel control module 71) and sends, in step S801, an appropriately formatted message (e.g. a 'Restrict Channel Request' message) to the AP part 5-2, requesting the AP part 5-2 to apply channel restriction with respect to one or more ISM channels. The HeNB part 5-1 also includes in the message sent at S801 information identifying the channels to be restricted (e.g. a channel ID associated with the ISM channel and/or a band ID associated with the interfering LTE band).

In response to the HeNB's 5-1 request, the AP part 5-2 determines (using its channel control module 71) whether or not it is able to apply the requested restriction. If the AP part 5-2 determines that it is able to proceed with the HeNB's 5-1 request, it begins to apply (in step S803) the channel restriction (using its channel control module 71) with respect to the ISM channel(s) identified in the request received at S801. Such a channel restriction may be maintained by the AP part 5-2 at least until receiving a further message from the HeNB part 5-1 lifting the restriction and/or until the expiry of an associated 'channel restriction' timer (which may be set to e.g. a default timer value and/or a timer value configured by the message at S801).

Once the AP part 5-2 has complied with the requested channel restriction, it generates (using its LTE interface module 69) and sends, in step S805a, an appropriate signalling message (e.g. a 'Restrict Channel Acknowledgement' message) informing the HeNB part 5-1 that the restriction is in place. Advantageously, the HeNB part 5-1 is able to communicate with the mobile devices 3 using the LTE channels neighbouring or overlapping with the ISM channel(s) operated by the AP part 5-2 without causing unnecessary interference to these communications.

It will be appreciated that any communications already allocated to the restricted ISM channel(s) may be either terminated or moved (handed over, steered, etc.) to a different (i.e. non-restricted) channel.

In this embodiment, the HeNB part 5-1 may use, for example, LTE frequency Band 40 and it may request the AP part 5-2 to restrict usage of at least one of ISM Channels 1 to 3. The HeNB part 5-1 may also use LTE frequency Band 7 (and/or LTE Band 41), in which case it may request the AP part 5-2 to restrict usage of at least one of ISM Channels 12 to 14.

Second Embodiment

Figure 8B:
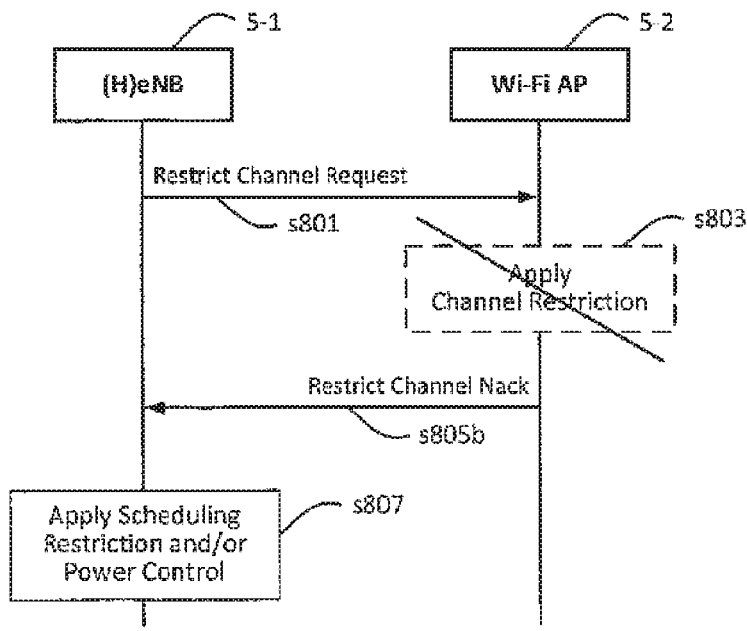

FIG. 8b shows a modification of the method shown in FIG. 8a. In this case, the AP part 5-2 is unable to comply with the requested channel restriction and the HeNB part 5-1 is configured to alleviate interference on its own.

Step S801 of FIG. 8b is identical to step S801 of FIG. 8a. However, in this case the AP part 5-2 (using its channel control module 71) determines that the requested channel restriction cannot be applied. This may happen, for example, when such restriction is already in place, the channel to be restricted is not supported by the AP part 5-2, the channel is used by communications that cannot be interrupted/moved to other channels, and/or the like.

As shown generally in step S803, the AP part 5-2 does not apply the requested channel restriction. Instead, the AP part 5-2 generates (using its LTE interface module 69) and sends, in step S805b, an appropriate signalling message (e.g. a 'Restrict Channel Negative Acknowledgement (Nack)' message) informing the HeNB part 5-1 that the requested restriction cannot be complied with (at least with respect to some of the channel identified in the message at S801).

Advantageously, in this case the HeNB part 5-1 is able to apply a scheduling restriction (using its channel control module 71) and/or apply power control (using its power control module 72) to its own communications (e.g. with the mobile device 3-1) over the affected LTE Band. Thus, for example, if the AP part 5-2 is unable to restrict usage of at least one of ISM Channels 1 to 3, the HeNB part 5-1 may restrict usage of its own LTE frequency Band 40 (in downlink, uplink, or both). If the AP part 5-2 is unable to restrict usage of at least one of ISM Channels 12 to 14, the HeNB part 5-1 may restrict usage of its own LTE frequency Band 7 (and/or Band 41), in downlink and/or uplink.

The HeNB part 5-1 is thus able to communicate with the mobile devices 3 without causing unnecessary interference to these communications using appropriate LTE bands (i.e. non-restricted bands) even if the AP part 5-2 cannot or does not comply with the requested restriction.

Third Embodiment

Figure 9A:
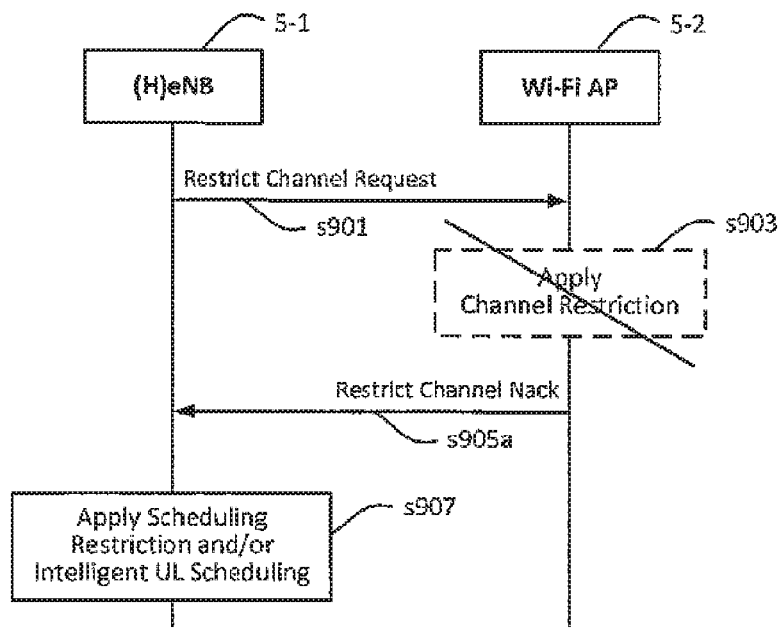

FIG. 9a shows another modification of the method shown in FIG. 8a. Similarly to FIG. 8b, in this case the AP part 5-2 is unable to comply with the requested channel restriction and the HeNB part 5-1 is configured to alleviate interference on its own.

Steps S901 to S905a correspond to steps S801 to S805b of FIG. 8b, respectively, hence their description will not be repeated here.

In this case however, as shown in step S907, the HeNB part 5-1 (using its channel control module 71) applies a scheduling restriction and/or intelligent uplink scheduling to its own communications (e.g. with the mobile device 3-1) over the affected LTE Band(s). This may be particularly beneficial in case of LTE Band 7 in the uplink in case the AP part 5-2 is unable to restrict usage of at least one of ISM Channels 12 to 14. However, it will be appreciated that this modification may also be applied to downlink communications in LTE Band 7 and/or communications in other bands, e.g. LTE Bands 40/41, as described above.

Additionally, the HeNB part 5-1 may also be configured to obtain from the AP part 5-2 (e.g. in step S905a or in a separate step) information identifying a frame timing applied by the AP part 5-2, i.e. information identifying the transmission pattern (if any) and/or duration used by the AP part 5-2 over the interfering channel. Beneficially, the HeNB part 5-1 is able to apply intelligent uplink scheduling for the affected LTE Band(s) using the obtained frame timing information, e.g. by avoiding scheduling UL transmissions in the affected LTE band(s) (e.g. Band 7/41) for the duration of the AP's 5-2 transmissions in the interfering ISM Channel (s) (e.g. Channel 12/13/14).

Fourth Embodiment

Figure 9B:
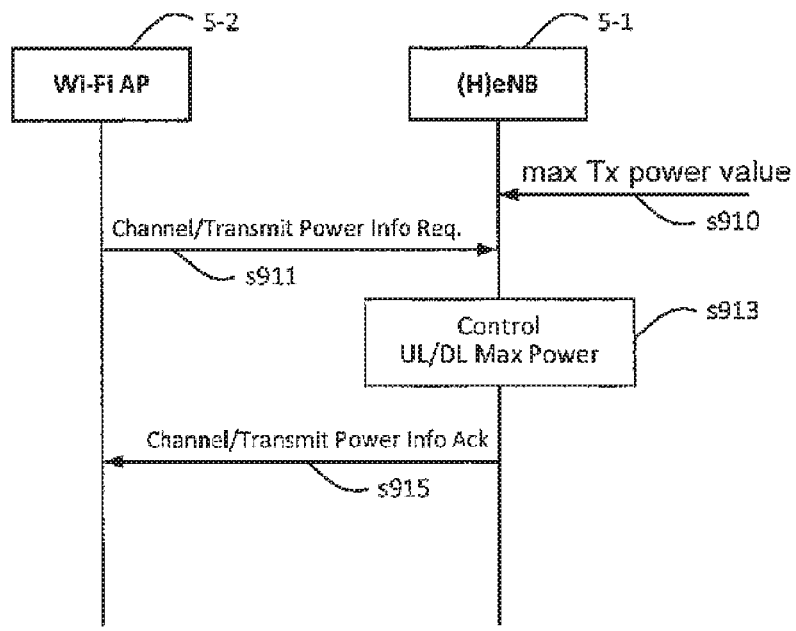

FIG. 9*b* shows an exemplary timing diagram illustrating a method performed by the HeNB part 5-1 and the AP part 5-2 of the mobile telecommunication system 1 shown in FIG. 1. In this example, the HeNB part 5-1 is configured to control its maximum transmit power based on information obtained from the AP part 5-2.

Initially, as generally shown in step S910, the HeNB part 5-1 receives the applicable maximum transmission ('Tx') power value from the Home eNodeB Management System (HeMS). The HeNB part 5-1 is configured to adjust, based on information obtained from the AP part 5-2, its maximum transmission power, thereby reducing (as much as possible) the amount of interference to the coexisting AP part 5-2.

Specifically, in this example the AP part 5-2 (using its power control module 72) generates and sends, in step S911, an appropriately formatted message (e.g. a 'Channel/Transmit Power Information Request' message) to the HeNB part 5-1, e.g. over the dedicated interface 100. The AP part 5-2 includes in this message information identifying one or more channel (e.g. at least one of ISM Channels 1 to 3, and 12 to 14) used by the AP part 5-2 in its communications with the mobile devices 3, and a respective associated transmit power used in the identified one or more channel.

Next, in step S913, the HeNB part 5-1 configures its power control module 72 to apply an appropriate UL/DL maximum transmit power, which also takes into account the received information identifying the one or more channel used by the AP part 5-2 and the respective associated transmit power.

Specifically, the HeNB part 5-1 is configured to adjust the value of the so-called 'Pmax' parameter (which determines the HeNB's 5-1 maximum transmission power) based on an offset that is dependent on the channel information and/or power used by AP part 5-2. Further, the HeNB part 5-1 is configured to adjust/set the maximum allowed UL transmit power of the mobile devices 3 within the cell operated by the HeNB part 5-1, also based on the received information identifying the one or more channel used by the AP part 5-2 and the respective associated transmit power. It will be appreciated that in determining an appropriate UL/DL maximum transmit power the HeNB part 5-1 may be configured to take into account other information as well, for example, information relating to network monitor mode (NMM) measurements (also referred to as Network Listen Mode (NLM) measurements).

Once the HeNB part 5-1 has successfully configured its power control module 72 with the appropriate UL/DL maximum transmit powers, it generates (using its ISM interface module 67) and sends, in step S915, an appropriate signalling message (e.g. a 'Channel/Transmit Power Information Acknowledgement' message) to the AP part 5-2.

Beneficially, by applying an appropriate transmit power setting (to the HeNB's 5-1 transmissions) that also take into account the information identifying the AP's 5-2 channel(s) and associated transmit power(s), the HeNB part 5-1 is able to alleviate (on-going or potential) interference resulting from the simultaneous use of both the LTE and the non-LTE (ISM) communication technologies in the dual FAP 5.

Fifth Embodiment

Figure 10A:
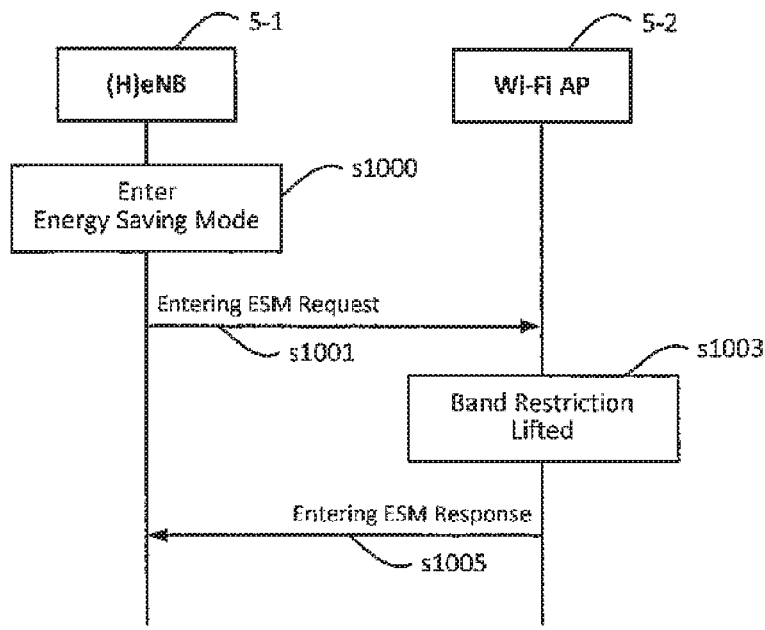
Figure 10B:
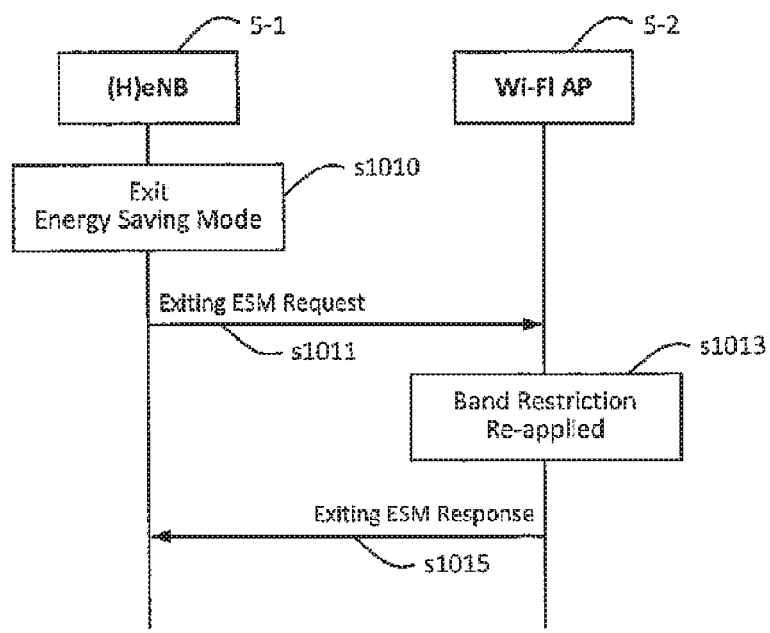

FIGS. 10*a* and 10*b* show exemplary timing diagrams illustrating a method performed by the HeNB part 5-1 and the AP part 5-2 of the mobile telecommunication system 1 shown in FIG. 1. In this example, the HeNB part 5-1 is configured to control the AP's 5-2 band restriction based on the current operating state of the HeNB part 5-1.

The procedure begins in step S1000, in which the HeNB part 5-1 enters an energy saving mode (ESM), e.g. during which transmissions over one or more (e.g. all) LTE frequency bands are suspended. In response to this change of operating mode, the HeNB part 5-1 (using its ISM interface module 67) generates and sends, in step S1001, an appropriately formatted message (over the dedicated interface 100) informing the AP part 5-2 about the activation of the energy saving mode. The HeNB part 5-1 may also include in this message information identifying the LTE Bands in which its transmissions are suspended (e.g. if not all LTE Bands are suspended) and/or for which the ESM is applicable.

In response to this message, as shown in step S1003, the AP part 5-2 (using its channel control module 71 and/or power control module 72) discontinues the enforcement of any restriction that has been applied to its ISM transmissions (e.g. in any of Channels 1 to 3, and 12 to 14). The AP part 5-2 (using its LTE interface module 69) generates and sends, in step S1005, an appropriately formatted message (e.g. an 'Entering ESM Response' message) to the HeNB confirming that the ISM band restrictions have been lifted.

FIG. 10*b* illustrates the reverse of this procedure, in which the HeNB part 5-1 exits the energy saving mode of operation and notifies the AP part 5-2 to start applying one or more restrictions to its ISM communications thereby alleviating a potential interference arising due to the concurrent use the LTE and non-LTE technologies.

As shown in step S1010, this procedure begins when the HeNB part 5-1 exits the energy saving mode of operation (e.g. the ESM mode described above). In response to this change of operating mode, the HeNB part 5-1 (using its ISM interface module 67) generates and sends, in step S1011, an appropriately formatted message (e.g. over the dedicated interface 100) informing the AP part 5-2 about the HeNB part 5-1 resuming its normal (i.e. non-ESM) mode of operation, in which the HeNB's 5-1 transmissions over the LTE frequency bands are no longer suspended (e.g. the de-activation of the energy saving mode entered in step S1010). The HeNB part 5-1 may also include in this message information identifying the LTE Bands in which its transmissions are no longer suspended and/or LTE Bands in which its transmissions are suspended (e.g. if some LTE Bands remain suspended).

In response to this message, as shown in step S1013, the AP part 5-2 (using its channel control module 71 and/or power control module 72) begins applying an enforcement of the restriction to its ISM transmissions (e.g. in any of Channels 1 to 3, and 12 to 14). It will be appreciated that the required restrictions may be identified by the HeNB part 5-1 including appropriate information in the message sent at S1011 and/or in any other suitable message (such as the messages described above with reference to FIGS. 8*a* to 9*b*).

Next, the AP part 5-2 (using its LTE interface module 69) generates and sends, in step S1015, an appropriately formatted message (e.g. an 'Exiting ESM Response' message) to the HeNB confirming that the ISM band restrictions have been (re-) applied.

It will be appreciated that at this point the procedure may return to step S1010, e.g. if the HeNB part 5-1 subsequently enters its energy saving mode.

Thus, in summary, whenever the HeNB part 5-1 enters the energy saving mode, it may inform the AP part 5-2 (e.g. over the dedicated interface 100) about its current energy saving mode (and/or its mode transition) so that the AP part 5-2 can beneficially lift any restriction (e.g. a restriction on ISM channel usage, transmission power, and/or scheduling) that have been imposed by the HeNB part 5-1 in order to alleviate an interference arising due to the coexistence of the LTE and non-LTE transmissions. Similarly, whenever the HeNB part 5-1 exits the energy saving mode, it may inform the AP part 5-2 about its current energy saving mode (and/or its mode transition) so that the AP part 5-2 can beneficially apply (or re-apply, as appropriate) any requested restriction (e.g. a restriction on ISM channel usage, ISM transmission power, and/or ISM scheduling) in order to alleviate an interference (or potential interference) arising from the coexistence of the LTE and non-LTE technologies in the dual FAP 5.

It will be appreciated that, by effectively mirroring the above described procedures, the AP part 5-2 may also be configured to inform the HeNB part 5-1 about its current energy saving mode (and/or energy saving mode transition), in which case the HeNB part 5-1 may apply/lift an appropriate restriction to its own transmissions in an LTE Band affected by the AP's 5-2 ISM transmissions, in dependence on the AP's 5-2 actual energy saving mode.

Figure 10C:
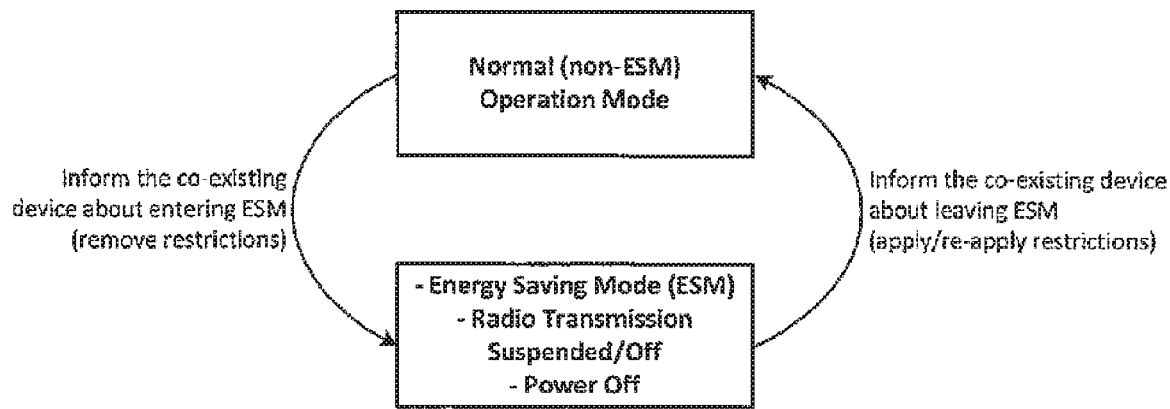

The state transitions and the associated notifications sent between the HeNB part 5-1 and the AP part 5-2 (in either direction) are further illustrated in FIG. 10c.

Using the exchanged information relating to the current power state of the HeNB part 5-1 and/or the AP part 5-2, the dual FAP 5 is beneficially able to alleviate a potential interference by restricting/allowing the use of certain frequency bands/channels in dependence on the current operating mode of the HeNB part 5-1 and/or the AP part 5-2.

Sixth Embodiment

Figure 11:
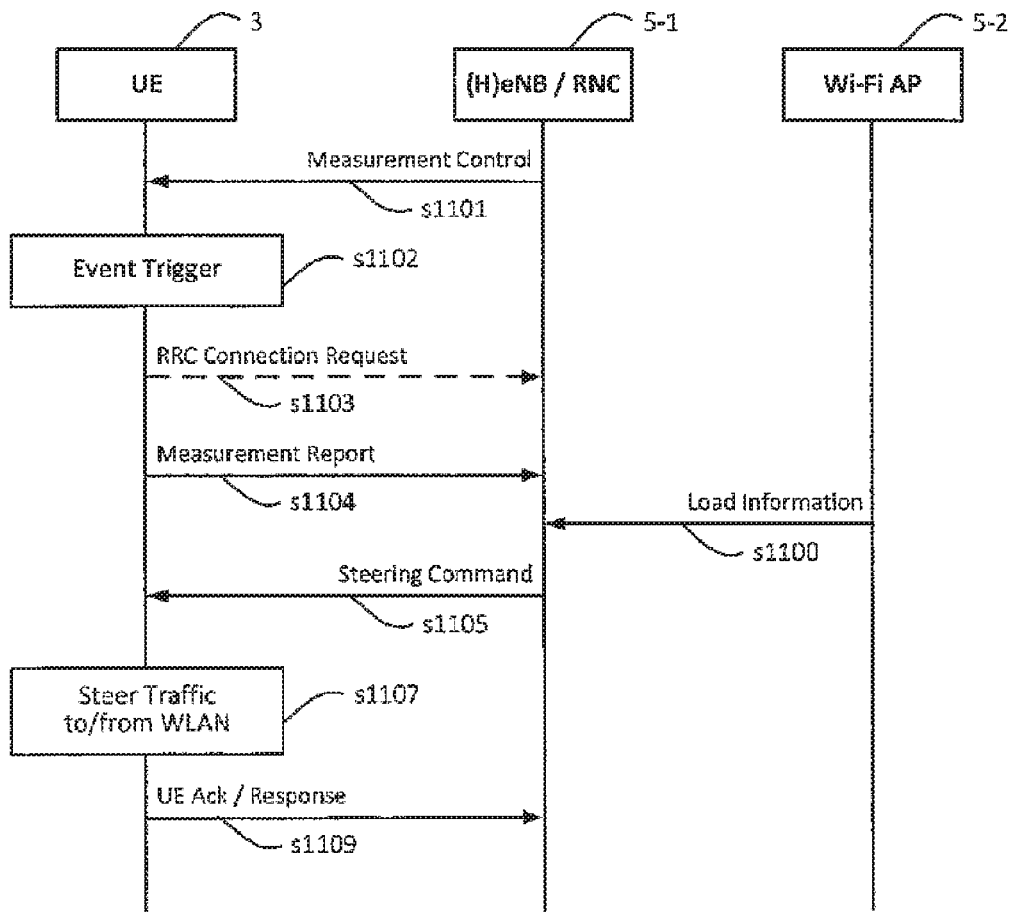
Figure 12:
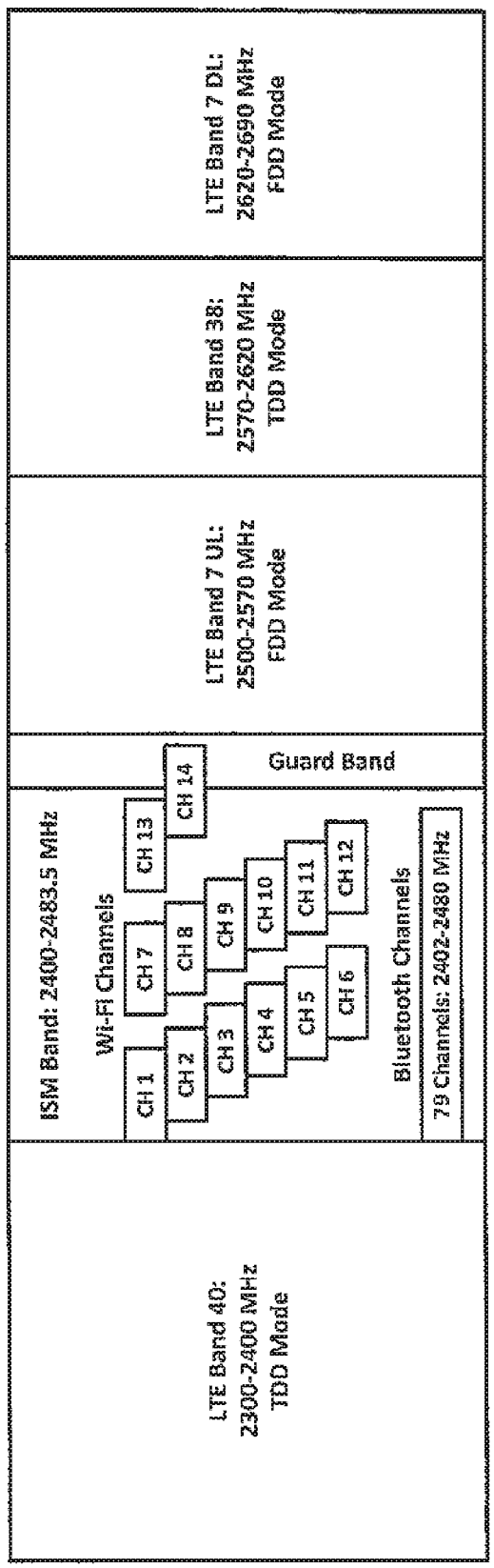
FIG. 12 illustrates some of the frequency bands and channels that may be affected by interference arising from the coexistence of LTE and non-LTE technologies in the same base station.

FIG. 11 shows an exemplary timing diagram illustrating a method performed by the HeNB part 5-1 and the AP part 5-2 of the mobile telecommunication system 1 shown in FIG. 1. In this example, the HeNB part 5-1 is configured to control the steering of traffic to/from the AP part 5-2 based on load information obtained from the AP part 5-2.

It will be appreciated that in this embodiment the messages used between the HeNB part 5-1 and the mobile device 3 (denoted 'UE' in FIG. 11) conform to the RRC protocol specified in 3GPP TS 36.331. Specifically, the message sent at S1101 may comprise an 'RRCConnectionReconfiguration message' described in Section 5.5.1 of TS 36.331 and the message sent at S1104 corresponds to the message described in Section 5.5.5 "Measurement reporting" of TS 36.331. Step S1102 may correspond to any of the event triggers A1 to A6, B1, and B2 described in sections 5.5.4.2 to 5.5.4.8 of TS 36.331. The contents of the above sections of TS 36.331 are incorporated herein by reference. Further, step S1102 may comprise an event trigger relating to a non-LTE (e.g. ISM) measurement, such as a Wi-Fi signal strength measurement, a Wi-Fi interference measurement, and/or the like.

In this case however, as generally illustrated in step S1100, the HeNB part 5-1 is operable to obtain load information (e.g. congestion status information) from the AP part 5-2. It will be appreciated that although in FIG. 11 step 5-2 is shown to take place between steps S1104 and S1105, step S1100 may take place any time before step S1105, e.g. prior to or after S1101. Further, it will be appreciated that the message at step S1100 may be sent by the AP part 5-2 in response to an associated request (not shown in FIG. 11) received from the HeNB part 5-1 (e.g. over the dedicated interface 100).

In any case, the HeNB part 5-1 is configured to take into account the load information obtained from the Wi-Fi AP part 5-2 (e.g. instead or in addition to the measurement report received at S1104) in its decision to trigger the steering of traffic to/from the Wi-Fi AP part 5-2. Thus, when the HeNB part (using its load balancing module 70) determines that some or all mobile devices 3 may be steered to/from the Wi-Fi AP part 5-2, it generates (using e.g. its RRC module 65) and sends, in step S1105, an appropriately formatted signalling message requesting the mobile devices 3 to steer to/from the Wi-Fi AP part 5-2 in dependence on the load (e.g. congestion status/capacity) of the AP 5-2 part indicated by the load information received at S1100, thereby alleviating the (potential) interference arising from the coexistence of the LTE and non-LTE technology in the dual FAP 5.

For example, if the load information from the AP part 5-2 indicates that the load of the AP part 5-2 (e.g. the number of mobile devices served in the AP's 5-2 cell and/or the amount of its capacity used) is above a predetermined threshold, then the HeNB part 5-1 instructs the mobile device 3 to steer away from the AP part 5-2 (and to possibly use another AP part and/or to use the LTE technology instead). However, if the load information from the AP part 5-2 indicates that the load of the AP part 5-2 is not above (e.g. it is below) a predetermined threshold, then the HeNB part 5-1 instructs the mobile device 3 to steer to the AP part 5-2 and/or another access point part (e.g. from the HeNB part 5-1).

As shown generally in step S1107, the mobile device 3 complies with the HeNB's 5-1 steering command, and performs an appropriate steering of its communications to/from the wireless local area network (WLAN) that the AP part 5-2 belongs to. Finally, the mobile device 3 acknowledges/confirms successful receipt of the steering command.

In either scenario, by steering the mobile device 3 to/from the AP part 5-2/WLAN, the dual FAP 5 is beneficially able to alleviate an undesired interference arising from its concurrent use (the coexistence) of the LTE and non-LTE technology.

Modifications and Alternatives

A detailed exemplary embodiment has been described above. As those skilled in the art will appreciate, a number of modifications and alternatives can be made to the above embodiment whilst still benefiting from the inventions embodied therein.

Although the mechanism described here is for co-located dual mode FAPs, it can also be extended to the FAP devices that are not co located but e.g. in close proximity. It will be appreciated that in this case the messages may be exchanged, for example, through a common gateway and/or a controlling node.

In the above exemplary embodiment, a mobile telephone based telecommunication system was described. As those skilled in the art will appreciate, the techniques described in the present application can be employed in other communication systems. Other communication nodes or devices (both mobile and stationary) may include user devices such as, for example, personal digital assistants, smartphones, laptop computers, web browsers, etc.

In the above exemplary embodiments, a number of software modules were described. As those skilled will appreciate, the software modules may be provided in compiled or un-compiled form and may be supplied to the dual FAP or to the mobile device as a signal over a computer network, or on a recording medium. Further, the functionality performed by part or all of this software may be performed using one or more dedicated hardware circuits. However, the use of software modules is preferred as it facilitates the updating of the dual FAP (HeNB part/AP part) and the mobile device in order to update their functionalities.

In the above exemplary embodiments, the concurrent LTE and non-LTE communications are carried out by the same dual FAP. However, whilst the above exemplary embodiments have particular benefit for alleviating in device coexistence interference issues, it will be appreciated that some aspects of the invention may be employed to alleviate interference in situations where one base station communicates using the LTE RAT and another but separate base station/access point in the vicinity communicates using a non-LTE radio technology. Further, it will be appreciated that the above mechanisms may also be applicable to a base station operating in an unlicensed spectrum, such as a base station (of a dual FAP) conforming to a future release of the LTE Advanced (LTE-A) set of standards (in addition to the LTE and/or ISM standards).

In the above exemplary embodiments, the dual FAP 5 comprises separate LTE and ISM baseband circuits 50-1 and 50-2. Each baseband circuit 50-1 and 50-2 is coupled to its own radio frequency transceiver 51-1 and 51-2 and uses its dedicated antenna 53-1 and 53-2. It will be appreciated that the baseband circuits 50-1 and 50-2, the transceivers 51-1 and 51-2, and the antennas 53-1 and 53-2 might be combined in one component. Alternatively, the dual FAP 5 might employ separate circuits and/or separate transceivers and/or separate antennas for each type of RAT that it supports. For example, although both Bluetooth and Wi-Fi are ISM radio access technologies, these standards may be implemented using separate circuits and/or separate transceivers and/or separate antennas. It is also possible that a given RAT requires more than one antenna or uses a separate transmitter and/or receiver part.

The exemplary embodiments have been described using Wi-Fi transceivers as an example of a non-LTE (in this case, ISM) radio technology. However, the mechanisms described herein can be applied to other non-LTE radio technologies (e.g. other ISM technologies, such as Bluetooth, NFC, etc. and/or GPS technologies).

For example, the mechanisms may be applied to the following ISM technologies:
Bluetooth devices;
Cordless phones;
Near field communication (NFC) devices;
Wireless computer networks, such as HIPERLAN, Wi-Fi (IEEE 802.11);

Wireless technologies based on IEEE 802.15.4, such as ZigBee, ISA100.11a, WirelessHART, and MiWi.

The mechanisms may also be applied to the following Global Navigation Satellite System (GNSS) technologies:
Global or regional satellite navigation systems, such as GPS, GLONASS, Galileo, Compass, Beidou, DORIS, IRNSS, and QZSS;
Global or regional Satellite Based Augmentation Systems, such as Omnistar, StarFire, WAAS, EGNOS, MSAS, and GAGAN;
Ground based augmentation systems, such as GRAS, DGPS, CORS, and GPS reference stations operating Real Time Kinematic (RTK) corrections.

In the above exemplary embodiment described with reference to FIG. 9b, the HeNB part is described to adjust/set its own transmit power (DL) and the transmit power (UL) for the mobile devices in the HeNB's cell based on information obtained from the AP part. It will be appreciated that the HeNB part may be configured to adjust the value of '$P_{eMax}$' as described in 3GPP TS 36.331, based on an offset that is dependent on the channel information/power used by the Wi-Fi AP part (obtained in step S911). It will also be appreciated that the so calculated $P_{eMax}$ may be used for calculating the value of '$P_{CMAX}$', which is defined in 3GPP TS 36.101.

Further, the HeNB part may be configured to derive the power ('$P_{PUSCH}$') used on the physical uplink shared channel (PUSCH), e.g. using the following formula (in accordance with 3GPP TS 36.213):

$$P_{PUSCH}(i) = \min\{P_{CMAX}, 10 \log_{10}(M_{PUSCH}(i)) + P_{O\_PUSCH}(j) + \alpha(j) \cdot PL + \Delta_{TF}(i) + f(i)\}$$

The HeNB part may also be configured to derive the power ('$P_{PUSCH}$') used on the physical uplink control channel (PUCCH), e.g. using the following formula (in accordance with 3GPP TS 36.213):

$$P_{PUCCH}(i) = \min\left\{\begin{array}{l} P_{CMAX,c}(i) \\ P_{0\_PUCCH} + PL_c + h(n_{CQI}, n_{HARQ}, n_{SR}) + \Delta_{F\_PUCCH}(F) + \Delta_{TxD}(F) + g(i) \end{array}\right\}$$

However, it will be appreciated that, irrespective of whether or not the AP part has provided its channel information/transmit power information to the HeNB part, the HeNB part may be configured to autonomously perform power control/adjustment, i.e. without taking into account any information received from the Wi-Fi AP part. This may be the case, for example, if LTE service is prioritized over Wi-Fi service. It will be appreciated that the HeNB part may perform power control purely based on NMM measurements/UE reports.

In the above exemplary embodiments described with reference to FIGS. 8a to 9a, and 10a to 11, the HeNB part is described to initiate procedures by sending an appropriately formatted message to the AP part (e.g. a restrict channel request, a power info request, entering/exiting ESM notifications, etc.) or to the mobile device (e.g. a steering command). However, it will also be appreciated that similar actions may also be triggered by the AP part (instead of the HeNB part) by the AP part sending an appropriately formatted message to the HeNB part (or the mobile device).

It will be appreciated that if the HeNB's current frequency is experiencing an IDC interference (and assuming that the HeNB part is able to use a different frequency), then the HeNB part may be configured to perform a so-called carrier frequency reselection procedure. Carrier frequency reselection may be required if excessive interference is experienced by the HeNB part either due to co-existing transmissions by the AP part and/or neighbouring HeNB parts/Wi-Fi AP parts. In this case, the HeNB part may be configured to perform an appropriate NMM operation and use any information received from the AP part (e.g. over the internal interface) about the AP's channels and the associated transmission powers in order the HeNB part to be able to assess the interference situation and evaluate which carrier frequency it needs to reselect. Additionally, on changing (reselecting) the carrier frequency, the HeNB part may be configured to inform the co-existing Wi-Fi AP part about its newly selected operating frequency so that any restriction can be lifted by the AP part if the new HeNB part operating frequency is away from the lower portion of FDD band 7, the upper portion of TDD Band 40, and/or the lower portion of Band 41.

In the above exemplary embodiment described with reference to FIGS. 10a and 10b, the HeNB part is described to control the AP's restrictions to use certain parts of the ISM band by sending an appropriate notification about its current energy saving state (i.e. whether or not its LTE transmissions are suspended). In a modification of this exemplary embodiment, it will be appreciated that the HeNB part may also notify the co-located AP part whether or not its LTE radio transmissions are turned off (instead of being suspended). For example, the HeNB part may be required to turn off its LTE transceiver in response to a command (e.g. a 'Radio Transmission OFF' command) received from an HeMS entity and/or the like. The HeNB part may also be required to turn off its LTE transceiver (e.g. automatically or upon user action) in case of an HeNB failure and/or an HeNB location change. It will be appreciated that in such cases the procedures described with reference to FIGS. 10a and 10b may be adapted to inform the AP part about the turning off and a subsequent turning on of the HeNB's LTE transceiver, similarly to the indications sent upon the HeNB part entering/exiting the energy saving mode.

In the above exemplary embodiments, the interference issues have been described with respect to one device (e.g. dual FAP) operating both the LTE and the non-LTE transceivers. However, it will be appreciated that the exemplary embodiments are applicable to interference issues involving multiple devices, e.g. one device operating an LTE transceiver and another device operating an ISM transceiver. The exemplary embodiments are also applicable to dual FAPs which do not have any ongoing LTE transmissions (but e.g. their ISM transmissions suffer from interference by another device).

The at least one operation to alleviate interference may comprise at least one of:
an operation to restrict a channel operated by at least one of said base station module and said access point module;
an operation to restrict a transmit power usable by at least one of said base station module and said access point module;
an operation to schedule communications via at least one of said base station module and said access point module;
an operation to reselect a carrier frequency used by at least one of said base station module and said access point module; and
an operation to steer traffic to/from at least one of said base station module and said access point module.

In one possibility, the co-operation to alleviate interference may comprise one of said base station and said access point modules sending a request, via said interface, for the other of said base station and said access point modules to restrict a channel operated by the other one of said base station and said access point modules.

In one possibility, when said other of said base station and said access point modules restricts said channel, in accordance with said request, said at least one operation to alleviate interference may comprise said other of said base station and said access point modules restricting communications via said channel in response to said request.

In one possibility, one of said base station and said access point modules may be configured: i) for entering an energy saving mode in which transmission in at least one channel is suspended; and ii) when in said energy saving mode, for leaving said energy saving mode and to resume said transmission in said at least one channel. In this case, the other of said base station and said access point modules may be configured: i) when said one of said base station and access point modules enters said energy saving mode, to lift a communication restriction with respect to said at least one channel; and ii) when said one of said base station and access point modules leaves said energy saving mode, to perform at least one operation, to alleviate interference, comprising imposing or re-imposing a communication restriction with respect to said at least one channel.

In one possibility, when said other of said base station and said access point modules does not restrict said channel, in accordance with said request, it may send as part of said co-operation, via said interface, a response to said request. In this case, said one of said base station and said access point modules may be configured to perform, based on said response, an operation, to alleviate interference, comprising restricting communications via at least one channel operated by said one of said base station and said access point modules.

In one possibility, the other of said base station and said access point module may be configured to, when said other of said base station and said access point modules does not restrict said channel, in accordance with said request, send as part of said co-operation, via said interface, a response to said request; and said one of said base station and said access point modules may be configured to perform, based on said response, an operation, to alleviate interference, comprising restricting a transmit power of said one of said base station and said access point modules.

In one possibility, said other of said base station and said access point module may be configured to, when said other of said base station and said access point modules does not restrict said channel, in accordance with said request, send as part of said co-operation, via said interface, a response to said request; and said one of said base station and said access point modules may be configured to perform, based on said response, an operation, to alleviate interference, comprising scheduling communications via said one of said base station and said access point modules to avoid said interference.

In one possibility, the co-operation may comprise said base station module obtaining, via said interface, information identifying a load level of said access point module, and said at least one operation to alleviate interference may comprise at least one operation based on said information identifying a load level of said access point module. In this case, the at least one operation to alleviate interference may comprise steering communication traffic to/from at least one of said base station module and said access point module based on said information identifying a load level of said access point module.

In one possibility, the co-operation may comprise said base station module obtaining, via said interface, information identifying at least one channel operated by said access point module, and said at least one operation to alleviate interference may comprise at least one operation based on said information identifying at least one channel operated by said access point module. In this case, the at least one operation based on said information identifying at least one channel may comprise reselecting a carrier frequency used by said base station module based on said information identifying at least one channel operated by said access point module whereby to alleviate interference.

In one possibility, the co-operation may comprise said base station module obtaining, via said interface, information identifying a transmission power associated with at least one channel operated by said access point module, and said at least one operation to alleviate interference may comprise at least one operation based on said information identifying a transmission power. In this case, the at least one operation based on said information identifying a transmission power may comprise reselecting a carrier frequency used by said base station module based on said information identifying a transmission power. In one possibility, the at least one operation to alleviate interference may comprise applying at least one modified transmission power level for communications between said base station module and said one or more mobile communication devices based on said information identifying a transmission power.

The base station module and the access point module may be mounted within a common housing. The communication apparatus may comprise a dual mode femto access point. The base station module may comprise a home base station operating in accordance with the long term evolution (LTE) family of standards. The access point module may comprise an access point operating in accordance with the 802.11 family of standards by the Institute of Electrical and Electronics Engineers (IEEE).

Various other modifications will be apparent to those skilled in the art and will not be described in further detail here.

Glossary of 3Gpp Terms

AP Access Point
BT Bluetooth
DRX Discontinuous Reception
eNB Evolved NodeB-base station
E-UTRA Evolved UMTS Terrestrial Radio Access
E-UTRAN Evolved UMTS Terrestrial Radio Access Network
FAP Femto Access Point
FDM Frequency Division Multiplexing
GNSS Global Navigation Satellite System
GPS Global Positioning System
GW Gateway
HeMS Home eNodeB Management System
HeNB home base station
IDC In Device Coexistence
ISM Industrial, Scientific and Medical (radio bands)
LTE Long Term Evolution (of UTRAN)
MME Mobility Management Entity
RAT Radio Access Technology
RRC Radio Resource Control
RRM Radio Resource Management
SeGW Security Gateway
SIR Signal to Interference Ratio
TDM Time Division Multiplexing
UE User Equipment
DL Downlink—link from base station (dual FAP) to mobile device
UL Uplink—link from mobile device to base station (dual FAP)

This application is based upon and claims the benefit of priority from UK patent application No. 1410538.1, filed on Jun. 12, 2014, the disclosure of which is incorporated herein in its entirety by reference.

The invention claimed is:

1. An eNB comprising:
a transceiver configured to communicate with a user equipment (UE) and configured to provide Long Term Evolution (LTE) connectivity for the UE, the UE configured to use radio resources of an LTE network and a wireless local area network (WLAN); and
a controller configured to:
request, over a dedicated interface, to a communication device for providing a connectivity between the UE and the WLAN, a load information and a channel utilization time information of the WLAN;
receive, over the dedicated interface, the requested load information and the requested channel utilization time information from the communication device; and
receive, from the communication device over the dedicated interface, WLAN information identifying at least one channel or frequency band of the WLAN.

2. The eNB according to claim 1 wherein the load information comprises information identifying a number of UEs served by the communication device.

3. The eNB according to claim 1 wherein the load information comprises information identifying an available capacity of the communication device.

4. A communication apparatus comprising:
a transceiver configured to communicate with a user equipment (UE) and configured to provide a wireless local area network (WLAN) connectivity for the UE, the UE configured to use radio resources of a Long Term Evolution (LTE) network and the WLAN; and
a controller configured to:
receive, over a dedicated interface, from an eNB for providing a connectivity between the UE and the LTE network, a request for a load information and a channel utilization time information of the WLAN;
send, over the dedicated interface, the load information and the channel utilization time information to the eNB in accordance with the request; and
send, to the eNB over the dedicated interface, WLAN information identifying at least one channel or frequency band of the WLAN.

5. A method performed by an eNB comprising a communication module configured to communicate with a user equipment (UE) and configured to provide Long Term Evolution (LTE) connectivity for the UE, the UE configured to use radio resources of an LTE network and a wireless local area network (WLAN), the method comprising:
requesting, over a dedicated interface, to a communication device for providing a connectivity between the UE and the WLAN, a load information and a channel utilization time information of the WLAN;
receiving, over the dedicated interface, the requested load information and the requested channel utilization time information from the communication device; and receiving, from the communication device over the dedicated interface, WLAN information identifying at least one channel or frequency band of the WLAN.

6. A method performed by a communication device configured to communicate with a user equipment (UE) and configured to provide a wireless local area network (WLAN) connectivity for the UE, the UE configured to use radio resources of a Long Term Evolution (LTE) network and the WLAN, the method comprising:

receiving, over a dedicated interface, from an eNB for providing a connectivity between the UE and the LTE network, a request for a load information and a channel utilization time information of the WLAN;

sending, over the dedicated interface, the load information and the channel utilization time information to the eNB in accordance with the request; and sending, to the eNB over the dedicated interface, WLAN information identifying at least one channel or frequency band of the WLAN.

* * * * *